United States Patent [19]

Yablon

[11] Patent Number: 5,764,731
[45] Date of Patent: Jun. 9, 1998

[54] ENHANCED SYSTEM FOR TRANSFERRING, STORING AND USING SIGNALING INFORMATION IN A SWITCHED TELEPHONE NETWORK

[76] Inventor: Jay R. Yablon, 910 Northumberland Dr., Schenectady, N.Y. 12309-2814

[21] Appl. No.: 378,529

[22] Filed: Jan. 26, 1995

Related U.S. Application Data

[63] Continuation-in-part of Ser. No. 322,209, Oct. 13, 1994, abandoned.

[51] Int. Cl.⁶ .................... H04M 1/27; H04M 3/52
[52] U.S. Cl. .............. 379/88; 379/93.18; 379/93.23; 379/93.26; 379/216; 379/213; 379/355
[58] Field of Search ................... 379/216, 354, 379/355, 213, 97, 217, 201, 207, 142, 210, 211, 212, 67, 88, 89, 58, 59, 202, 205, 206, 203, 204, 93.18, 93.23, 93.26, 69, 57

[56] References Cited

U.S. PATENT DOCUMENTS

| | | | |
|---|---|---|---|
| 4,053,949 | 10/1977 | Recca et al. | 379/213 |
| 4,644,107 | 2/1987 | Clowes et al. | 379/354 |
| 4,724,539 | 2/1988 | Hiskes | 379/205 |
| 4,800,582 | 1/1989 | D'Agosto, III et al. | 379/55 |
| 4,839,919 | 6/1989 | Borges et al. | 379/96 |
| 4,852,146 | 7/1989 | Hathcock et al. | 379/58 |
| 4,924,496 | 5/1990 | Figa et al. | 379/142 |
| 4,926,461 | 5/1990 | Kouk | 379/212 |
| 4,933,968 | 6/1990 | Iggulden | 379/216 |
| 4,941,168 | 7/1990 | Kelly, Jr. | 379/69 |
| 4,942,598 | 7/1990 | Davis | 379/57 |
| 4,945,557 | 7/1990 | Kaneuchi et al. | 379/67 |
| 4,979,206 | 12/1990 | Padden et al. | 379/67 |
| 5,075,894 | 12/1991 | Iwase et al. | 379/69 |
| 5,097,502 | 3/1992 | Suzuki et al. | 379/358 |
| 5,127,040 | 6/1992 | D'Avello et al. | 379/58 |
| 5,148,473 | 9/1992 | Freeland et al. | 379/59 |
| 5,168,517 | 12/1992 | Waldman | 379/67 |
| 5,212,721 | 5/1993 | DeLuca et al. | 379/57 |

(List continued on next page.)

OTHER PUBLICATIONS

IBM Technical Disclosure Bulletin, "Mechanism to Automate Updating of Obsolete Telephone Numbers", vol. 37, No. 04A, pp. 115-116, Apr. 1994.

*Primary Examiner*—Krista Zele
*Assistant Examiner*—Daniel S. Hunter
*Attorney, Agent, or Firm*—Jay R. Yablon

[57] ABSTRACT

A system includes a telephone and a distant device. The distant device contains one or more telephone numbers which are later to be dialed at the telephone. The telephone numbers are transmitted in coded form, preferably dual tone multifrequency form, from the device to the telephone. The distant device may be a directory assistance service position, a caller ID receiver, and answering machine, a voice or electronic mail system, a terminal operated by a secretary or receptionist, or a simple DTMF keyboard. After the telephone numbers are received, they are stored in any of several memories in the telephone. Later, the user selects one of the entries for dialing and the entry is used for address signaling. Optionally, storage, selection and dialing of a memory entry can be further simplified by using voice processing techniques. The system is particularly pertinent to the driver of an automobile who is operating a cellular telephone, to a travelling individual who regularly receives and needs to return a large number of calls, to a pedestrian carrying a portable telephone, or to a person with a physical disability, because it saves the user having to jot down telephone numbers and dialing them manually. A particularly significant embodiment enables the user of this system to establish a customized paging service through an ordinary telephone network, using end-user, customer premises equipment only.

13 Claims, 19 Drawing Sheets

U.S. PATENT DOCUMENTS

| | | | |
|---|---|---|---|
| 5,255,310 | 10/1993 | Kim et al. | 379/88 |
| 5,259,026 | 11/1993 | Johnson | 379/213 |
| 5,265,145 | 11/1993 | Lim | 379/88 |
| 5,267,304 | 11/1993 | Slusky | 379/201 |
| 5,276,729 | 1/1994 | Higuchi et al. | 379/58 |
| 5,280,516 | 1/1994 | Jang | 379/57 |
| 5,305,372 | 4/1994 | Tomiyori | 379/59 |
| 5,329,578 | 7/1994 | Brennan et al. | 379/88 |
| 5,339,352 | 8/1994 | Armstrong et al. | 379/58 |
| 5,339,358 | 8/1994 | Danish et al. | 379/95 |
| 5,363,429 | 11/1994 | Fujisawa | 379/58 |
| 5,365,574 | 11/1994 | Hunt et al. | 379/88 |
| 5,371,779 | 12/1994 | Kobayashi | 379/58 |
| 5,390,236 | 2/1995 | Klausner | 379/67 |
| 5,394,445 | 2/1995 | Ball et al. | 379/67 |
| 5,434,906 | 7/1995 | Robinson | 379/67 |
| 5,454,029 | 9/1995 | Noda | 379/88 |
| 5,481,594 | 1/1996 | Shen et al. | 379/67 |
| 5,483,586 | 1/1996 | Sussman | 379/201 |
| 5,502,761 | 3/1996 | Duncan et al. | 379/142 |
| 5,509,049 | 4/1996 | Peterson | 379/58 |
| 5,559,862 | 9/1996 | Bhagat et al. | 379/58 |

\*1 = START STRING
\*9 = END STRING
(FOR EXAMPLE)

STANDARD KEYBOARD
POSITION, KEY

| | |
|---|---|
| A = (1, 2) | N = (2, 6) |
| B = (2, 2) | O = (3, 6) |
| C = (3, 2) | P = (1, 7) |
| D = (1, 3) | Q = (2, 7) |
| E = (2, 3) | R = (3, 7) |
| F = (3, 3) | S = (4, 7) |
| G = (1, 4) | T = (1, 8) |
| H = (2, 4) | U = (2, 8) |
| I = (3, 4) | V = (3, 8) |
| J = (1, 5) | W = (1, 9) |
| K = (2, 5) | X = (2, 9) |
| L = (3, 5) | Y = (3, 9) |
| M = (1, 6) | Z = (4, 9) |

KEYSTROKE SEQUENCE FOR JOSHUA:

| \*1 (START) | 15 (J) | 36 (O) | 47 (S) |
| 24 (H) | 28 (U) | 12 (A) | \*9 (END) |

ENHANCED SYSTEM FOR TRANSFERRING, STORING AND USING SIGNALING INFORMATION IN A SWITCHED TELEPHONE NETWORK

CROSS-REFERENCE TO RELATED APPLICATIONS

This application is a continuation-in-part of U.S. patent application Ser. No. 08/322,209, filed Oct. 13, 1994, now abandoned, which is herein incorporated by reference.

BACKGROUND OF THE INVENTION

Users of the telephone system today have a variety of methods available to them for obtaining the telephone numbers of individuals or businesses whom they wish to call. These include hard-copy telephone directories, directory assistance numbers (e.g., 555-1212 within the North American Numbering Plan (NANP)), personal telephone directories maintained by an individual or business, etc. There are also a number of different ways for individuals to obtain telephone messages and determine the phone numbers of parties whom they need to call back. These include automated devices such as telephone answering machines, pagers which display a callback number, and caller identification boxes, as well as human devices such as an office receptionist or secretary. Telephone memory storage and recall devices allow users to preprogram a limited personal directory of frequently-called telephone numbers into their telephone device, or, for example, to retain the last telephone number dialed from their telephone, and thus to automate the process of making some calls. But for the vast majority of calls, telephone users still must manually write down phone numbers on a piece of paper while speaking to a directory assistance operator, calling the office receptionist or listening remotely to the messages on their answering machine, or must have some other written or displayed representation of a phone number in front of them (e.g. on a pager), before they then proceed to manually punch such numbers into a telephone in order to place a call.

Particularly with the rapid increase in mobile telephone usage and the expected increase in the use of personal communications systems, personal digital assistants and similar devices, this system of manually recording, and then dialing telephone numbers is highly inconvenient. For the driver of a motor vehicle engaged in mobile telephone communications, it can be unsafe. And even for traditional fixed-location telephones, it is highly inefficient to call a directory operator, an office receptionist, or a home telephone answering machine, listen to and write down one or more telephone numbers, and then manually place telephone calls based on these numbers. It is also less-than-convenient for a pager user with a callback number displayed on a pager to track down and use a separate telephone to return the call.

One attempted approach to address some of these problems is a service commonly called "call completion". In the special case where the number the user wishes to dial is to be received from a directory assistance operator, where "call completion" is available the caller can indicate by a spoken signal or dialing of a DTMF (dual tone multifrequency) digit that call completion is desired. The carrier providing the telephone number then dials the call and connects it to the caller. A surcharge is generally imposed for this service, above and beyond the cost of the telephone call.

Call completion by directory assistance operators, if and when it is implemented in a calling area, would reduce the need for a user to manually write down and then dial a telephone number when using directory assistance. However, if the user wishes to call the number again (for example if the number being called was busy or unanswered or if the desired party was not available), the user would still have to write down the number or would have to place a later call to directory assistance to again ask for call completion to the same number. If the user wants to use the number at a later time other than via call completion, some method of manually recording the number would similarly be needed. Further, the availability of call completion in various calling areas is uneven at best. Similar limitations exist in present systems for advising a caller that the called number has been disconnected and changed to a specified new number, or in advising a caller that further information can be obtained by calling a different, specified number.

It will be appreciated, however, that directory assistance call completion leaves some of the above-described problems unaddressed. Consider the case of the business executive or travelling salesperson receiving, say, twenty phone messages from his or her secretary or telephone answering machine, who then has to write down twenty phone numbers and manually place twenty return phone calls, all while trying to drive an automobile safely. Consider also the case of a person with a physical disability for whom writing down phone numbers and placing calls may be next to impossible.

In the case where the secretary is providing information about pending telephone messages to someone who is driving a car, it might be thought that the driver could be saved having to write down and signal the telephone numbers by the expedient of having the secretary accomplish a sort of ersatz call completion by placing a three-way or bridged call with the driver and with a party named in a telephone message. But while asking a secretary or receptionist to forward a call to another number can mimic a call completion service, it is highly difficult to do this in sequence for multiple calls and requires a third party—the secretary—to remain on standby throughout. Also, the signal quality degrades each time a call is forwarded.

Various voice recognition schemes may be used to simplify the process of determining and calling a telephone number. For example, some systems enable a user to speak a name into a phone, recognize the name from the voice, and then lookup and call a number accordingly. But the reliability of voice recognition systems today is uneven, the better systems are fairly expensive, such systems generally must be taught to recognize the voice pattern of each individual that uses them, the size of the directory of listings for which such a system can be effective is very much constrained, and generally, these systems operate on a pre-defined directory of telephone numbers. There is certainly no universal voice pattern, and the development of an automated voice system that can find the single correct entry in a directory with potentially millions of entries is daunting, requiring the give-and-take of ordinary human conversation or of highly sophisticated computer programs, even if the voice recognition is performed perfectly. To increase the widespread utility of even the most rudimentary voice processing systems, methods are needed to simplify the range of voice commands and signals that a user needs to utter and to reduce the quantity of numbering information that needs to be searched to provide a desired telephone number.

It is already commonplace for many telephones to contain internal memories allowing them to store a handful of frequently-used telephone numbers, or to retain the last number dialed automatically. The entry of numbers into the telephone's memory is invariably done by the user, who manually enters a number while also designating a numbered memory location. But the numbers so stored are generally limited to frequently-called numbers, and must be manually entered via a series of strokes on the telephone keyboard.

Also, many people do not realize that this memory for frequently-dialed numbers can also be used to store the caller's own phone number and that a memory recall during an ongoing phone conversation can be used to send the DTMF digits of the caller's own number over the connection, directly from memory rather than via a series of keyboard entries, such that they can be heard at the other end of the connection. This comprises a rudimentary form of decentralized, user-customized caller identification that could, for example, simplify the process of signalling a pager via a paging service, but has not been exploited to date to nearly the extent possible.

Another approach is the use of a Caller identification (Caller ID) box having an automatic redial. The box has a button which, if pressed, results in redialing a telephone number that has been received via Caller ID. With such a box a phone number, even an infrequently or never-before used number, is stored and can be redialed as a result of a received calls, rather than as a result of manual entry by the phone user.

A caller ID box with such a function sometimes does not help, however, because sometimes the number that the phone user should dial is not the same as the number received via caller ID. For a person who is not located adjacent to the caller ID box, this benefit of having the numbers that need to be called already stored in the box's memory is no help. In addition, many political jurisdictions restrict or prohibit caller ID for reasons of personal privacy.

Further, implementation of caller ID today is centralized in the switches at telephone company central office facilities, rather than decentralized into intelligent end-user communications devices. Thus, individual users cannot readily customize their own caller ID "profiles" (for example, to specify a callback number different than the phone number they are calling from, to send a pictorial icon of themselves, etc.), and to easily decide for themselves whether or not to use caller ID features in the first place, irrespective of political jurisdiction or central office capability.

Telephone answering machines, which are in the nature of voice memories, are remotely accessible by dialing a correctly-coded sequence of touch tones comprising the owner's "password," but one must still listen to the voice recording, manually note the phone number to call, and then manually place the return call.

Paging devices—so-called "beepers"—are also used very commonly. With this device, a caller punches a sequence of touch tone digits corresponding to a requested callback number into his or her phone (or, as noted above, can already have these digits stored in the phone's frequently-dialed number memory and simply recall and transmit these digits from this memory) perhaps along with some additional digits identifying the caller. This number need not necessarily be the number that the caller is presently calling from, and can even be the number of some third party that is supposed to be called by the page recipient. These numbers are stored in the pager memory, and can subsequently be displayed by the pager user to determine the numbers to which his or her callbacks should be directed. However, the callback itself involves reading the numbers from the pager display, and then manually entering them into a separate telephone in order to make the callback. The pager itself does not signal a callback directly from its own memory. In addition, such pagers are used to receive incoming calls only. They are of no help to a pager user who needs to establish a connection with another location, such as a home answering machine or an office secretary, in order to receive messages and determine numbers that the user needs or wishes to call. Finally, today's pagers operate through a special, centralized paging service distinct from ordinary phone service, and it is this special service—not intelligent end-user devices operating through the basic switched telephone network—which takes DTMF digits and repackages them for transmission to and recognition by the pager, and which supplies any additional identifying information such as character strings or voice mail.

While prior art does allow a primary phone user to suspend a phone conversation to manually add a new number into memory (particularly the last-number-dialed memory location, or the "scratchpad" memory found on many cellular telephones) and then return to the conversation, this still requires manual entry of the number by the telephone user at the telephone keyboard prior to storage and signalling of a callback. It is also quite cumbersome for multiple numbers.

It would thus be very desirable if the driver of an automobile, a physically disabled individual, or anyone else for whom it is inconvenient to have to first jot down telephone numbers and then enter them manually before initiating a call, could have a telephone or paging device forming part of a system that saves having to jot down telephone numbers and/or enter them manually to signal a callback. It would be desirable for the system, to spare the user these burdens for telephone numbers received from directory assistance, from a secretary or receptionist, from a telephone answering machine, from a caller ID box, from voice or electronic mail, from another telephone user, or from a paging service.

SUMMARY OF THE INVENTION

The invention herein disclosed significantly simplifies the process through which telephone users can obtain and call one or more telephone numbers in a variety of settings. One or more telephone numbers, in touch tone, digital or other similar representation, are communicated from a remote location into storage in one or more locations in what may be termed a "primary user's" telephone memory, such that the stored number can then be employed directly by the primary user for later memory redial of that number. The telephone number is entered into the telephone's memory for redial purposes, not by the primary user, but by a user or server device (depicted the figures as a "remote number source" or "server") physically removed from the primary user's telephone. A multiplicity of such phone numbers can be stored in this manner, in a fraction of the time required for manual entry. Other helpful information ("enhanced user information") identifying the caller, such as a character code denoting the name of the person associated with a given phone number, an electronic or voice mail message, a facsimile message, a pictorial icon, or even a video message, may also optionally be transmitted and stored in this fashion. If an ISDN or broadband connection is employed, this identifying information can be conveyed via a data channel separate from communications on the voice channel, and higher-bandwidth communications are more readily facilitated. A memory-recall and redial process based optionally on rudimentary voice processing and recognition techniques completely eliminates the need for any keystrokes whatsoever by the primary user—even the simple one-or-two touch keystroke sequence used in ordinary memory recall—and makes the system completely hands-free. The invention has application in myriad settings, and is particularly beneficial for individuals who frequently travel, yet need to remain in touch with many other people, by telephone, during the course of such travel. It is also very beneficial for individuals with a physical disability who cannot easily write down or dial telephone numbers.

This remotely-generated signal which causes one or more numbers (and optionally, character and other enhanced user information) to be stored for later redial into the primary user's telephone can be generated from a variety of sources. One example is a directory assistance operator service position equipped to transmit a touch-tone or other coded rendition of the requested phone number instead of or in addition to a synthesized-voice recitation of the requested number. Another example is a primary user's home answering machine or caller ID box with appropriate transmission capability that records not only a verbal message, but also a machine-based representation of the number to call back, which can be written onto the answering machine's tape or other memory directly by a caller to the answering machine supplying the appropriate number or via caller ID methods. A similar approach may easily be used in voice or electronic mail applications. Still another example is a personal computer or smart television into which a secretary, for example, can enter various telephone numbers that the primary user needs to call for various reasons (callbacks, prescheduled calls, new calls that the boss wants to have made, etc.), which is equipped to transmit an appropriate set of touch tone or related signals the next time the user touches base with the office. Another telephone user ("secondary user") with whom the primary user is conversing can interrupt the conversation to supply one or more telephone numbers which are then transmitted to the primary user's telephone memory for memory storage. Finally, a pager receiving a telephone number and other enhanced user information from a paging service can be supplemented with a telephone device allowing number recall and signalling directly from the pager memory. In all these instances, the memory locations in the primary user's telephone are remotely programmed on a dynamic basis with phone numbers and, optionally, related identifying information such as character strings, by whomever or whatever device is providing the user with stored telephone numbers for later redial. Thereafter, memory recall and redial can proceed in the usual manner with but a very small number of keystrokes, or can be effected without any keystrokes at all through rudimentary voice processing and recognition techniques.

If appropriate internal memories and data communications capabilities are added to the caller's phone, it is further possible to minimize the number of keystrokes required of the caller and significantly enhance the quality of information conveyed. Particularly, callback and related caller identification information can optionally, as routine practice, be stored by the caller into his or her phone before calls are made and thus be available for transmission at any time during any call. In this case where a memory in the caller's telephone rather than in the central office switch supplies this callback and identifying information, the net effect is a decentralized, user-customized form of caller identification, not requiring any caller ID capability in the switch itself, which allows a user to customize his o her own callback and identifying information with a rich combination of character, sound, facsimile, pictorial and video information, and to precisely determine and control the level of caller identification privacy desired. As noted earlier, many people do not realize that the memory for frequently-dialed numbers found in many telephones today can already be used to store and send as DTMF digits the caller's own phone number, thus forming the rudiments of such a user-customized caller identification capability.

Thus, in the directory assistance example, the primary telephone user calls directory assistance and asks for a telephone number to be conveyed to him or her, not verbally via a voice robot, but electronically via a DTMF emitter or similar encoding device such that the number is then stored directly into the memory of his or her telephone. The primary user then utilizes the memory recall to dial the number without ever having to write it down, which is particularly advantageous when driving a motor vehicle. If the number is busy, or the called party is not available, it can be called back at a later time without going again through directory assistance, averting one of the problems of call completion. If the user does not wish to place the call immediately, the number is retained for redial as long as the user wishes. As mentioned earlier, optionally a character string and other identifying information to be associated with that number could also be transmitted and stored in memory. With appropriate memories added to the directory assistance station, this identifying information can contain a full combination of character, sound, facsimile, pictorial and video information. Also, optionally, a selection signal may be sent from the telephone to the server indicating whether or not it is desired to receive such a character string and other information. The same approach of transmitting a phone number via a DTMF emitter or similar encoding device can also be used to advise a caller that the called number has been disconnected and changed to a specified new number by encoding and transmitting that new number accompanied by other, optional information. It can also be used to advise a caller that further information can be obtained by calling a different, specified number, by similarly encoding and transmitting that number with other optional information. If the enhanced user information stored in association with telephone numbers in any of these directory assistance applications has an associated password code as well, then the person to whom that number belongs, by supplying the correct password code, can uniquely customize the directory assistance information associated with that person's own number. If the user's phone has the ability to process numeric voice utterances and translate them into digits, it is possible to transfer numbering information to the primary user's phone for subsequent redial via the usual voice signals of a voice robot.

In the answering machine/caller ID example, a caller is given the opportunity not only to leave a voice message, but to supply a number to which the call should be returned (which can also be that of a third party) or to have a caller ID system determine the caller's number and record this number on or with the stored message. In either case, the number itself is electronically stored on the tape or other memory device, along with the usual oral message. The caller also may optionally supply a character string and other user-customized caller identification information which can be stored in the answering machine/caller ID box, or such character string and other caller identification information which might be supplied as a mnemonic or other accompaniment to a caller ID. Then, when the primary phone user calls the answering machine from a remote location to receive messages, the primary user might conclude by sending a control signal to the answering machine asking it to transmit and download some or all of the stored numbers to the memory of his or her phone, along with any identifying character or other enhanced user information that may have been recorded. The same approach can be used in voice or electronic mail applications. At that point, the primary user can place calls with a simple series of memory-recall based dialings, without writing any of these numbers down or manually entering them in order to make a call. And again, voice processing and recognition methods can facilitate such memory recall even further, completely obviating the need for any manual activity. Accompanying character strings and other identifying information make this particularly convenient, by identifying for the primary phone user which numbers are in which memory locations, but again, these are not strictly necessary. Also, optionally, the caller's keystrokes can be reduced or eliminated if identifying numbering, character, and possibly sound, facsimile, pictorial and video information is already stored in a memory within the caller's phone such that it can be transmitted at will, in essence, comprising a user-based, rather than switch-based form of decentralized, customized caller identification. If the answering machine has the ability to initiate calls to the primary user's telephone upon certain conditions, it becomes possible for the primary user to establish a customized, end user equipment-based form of paging service, without the need for subscribing to a centralized paging service separate from ordinary telephone service.

In the personal computer/smart television example, a secretary may enter telephone calls and associated character strings into a computer throughout the business day as calls come in, as particular calls are identified that need to be made, etc. The primary phone user then calls the secretary, asks for messages, and asks that any of the numbering and other information accumulated in the computer be downloaded into his or her telephone memory. These messages may already have been ordered in the computer by the secretary or by a user preference profile in a certain manner so as to suit the primary user's calling preferences and priorities. Once the download transmission is complete, the primary user can engage in the memory-based dialing of numbers, without paper recording and without manual number entry. Coupled with voice processing and recognition techniques, manual keystrokes to effectuate this memory redial also become unnecessary. A process that could take many minutes manually, and would require pulling a motor vehicle off the road if the primary user is driving, could be completed in seconds and allow the primary user to continue driving without interruption.

In the example of another telephone user, the primary user, for example, might be driving an automobile while engaged in a phone conversation with a second user located at a desk. The primary user agrees to call the secondary user back in an hour with further information about whatever they are discussing. But the secondary user says he or she will be at a different number in an hour. Rather than verbally communicate this number, the secondary user, with hands free at a desk, can punch in an appropriate series of keystrokes to download that number to the phone memory of the primary user, while the primary user's hands remain free to drive the car. (The primary user, with sufficient foresight, may already have entered this number into the frequently-dialed number memory, and can then simply recall and send the DTMF tones corresponding to this number directly from memory.) When calling back in an hour, the primary user has never had to write the number down, and can signal the number directly from memory via memory recall, rather than manually. Again, coupled with voice processing and recognition techniques, manual keystrokes to effectuate memory redial also become unnecessary, further-enhancing utility. And again, the caller's keystrokes can be reduced or eliminated if identifying numbering, character, sound, facsimile, pictorial and video information is already programmed into the caller's phone, in essence, comprising a user-based, rather than switch-based form of decentralized, customized caller identification. Finally, if the primary user subscribes to a paging service, and his or her pager is supplemented with a telephone that can recall and dial telephone numbers in the pager memory (with appropriate number transformation, e.g., trimming area codes or adding a "1" in front of area codes as required), then the need can be completely eliminated to find a separate telephone, read a number off of the pager display, and then punch in and signal that number.

While all of the examples cited thus far involve briefly suspending an ongoing phone conversation to download one or more telephone numbers from a remote location into the primary user's telephone, this approach is readily supplemented and made even more useful if the telephone is combined with the functionality of a more traditional paging device, with optional functions akin to those of answering machines and/or caller ID boxes. For example, the primary user may have left such "paging telephone" in the car for a few minutes, during which time a call is received. The call can be written into the phone's memory just as numbers are written into the memory of a pager, but importantly, in such form as to allow the primary user to immediately redial from the paging telephone's memory locations once he or she returns to the telephone without manually redialing from a separate telephone, and without the need for a paging service that is distinct from one's telephone service. Further, if the paging telephone is set to work in paging mode after, say, four rings, and if the primary user is present while the phone is ringing, then the user has the option to use the this device similarly to a phone or a pager. By picking up before the fourth ring, the user can converse immediately, and during the conversation use the invention to download numbers from any remote number source in the usual manner. But by letting the phone continue after the fourth ring, (or perhaps by earlier pushing a button on the keyboard or by setting the phone to automatically pickup as soon as it detects and incoming call, i.e., by "zero" being the number of rings or the elapsed time required to activate paging) the primary user automatically selects a "paging" rather than "telephone" mode, wherein the ringing (beeping) itself alerts the user to the call, and the number sent by the caller is stored in the phone memory to be used for later redial and perhaps displayed on the screen and even combined with some form of voice mail/answering machine message. Importantly, unlike a traditional pager, this paging telephone can be engaged by the user to perform memory redial at a later time directly from the stored number. Further, once the phone goes past the fourth ring and, for example, the caller's number is displayed on the screen in paging mode and/or the user starts to hear a voice message being recorded, the primary user might wish to pick up the call immediately, before the connection is terminated, thereby switching back to telephone mode. In this instance, the paging phone performs similarly to a caller ID box or answering machine as well. A message indicator may be used to let the user know that a call has arrived. And again, all of the intelligence for this to occur is placed in the end user devices, so that no special services beyond ordinary phone service are required.

This approach can also be varied by attaching an acoustical DTMF tone generator to the telephone. In this instance, a number is received by the telephone, and when the telephone user wishes to return the call, he or she can pick up a separate telephone, establish a dial tone, and then use the telephone to generate the acoustical DTMF tones corresponding to the number in the telephone memory while holding the telephone near the mouthpiece of a second telephone, while that second telephone is sounding a DTMF-responsive dial tone. This activates a callback without the need for dialing a number, but does require access to a second phone that is separate from the original phone. While such DTMF tone generation capability responsive to an internal phone number memory does already exist for some pagers, it does not exist on ordinary phone devices operating independently of a paging network.

It is also helpful, and facilitates a broad range of voice processing applications, if the telephone used by a primary user or a caller (secondary user) in connection with this invention, contains a "voice keyboard" allowing voice intonation of the name of any alphanumeric or function key to have precisely the same effect as if the corresponding key was pressed on the ordinary manual keyboard. This voice keyboard would be "trained" to recognize one vocal signal corresponding precisely to each keyboard key, from the user of that telephone. Such a keyboard can make the use of the primary user's telephone entirely hands-free.

Another variation of this invention involves call waiting. In this variation, a phone user might receive a signal indicating a call waiting, but would also have a phone number emitted either by the waiting caller or by a caller ID system read into the memory of his or her telephone, possibly along with other information indicating who is calling. Once again, this would enable the phone user to call that number back at a later time without having to write down or enter the number.

There are also some useful variations on the answering machines and related server devices that send telephone numbers to the user's telephone. For example, as noted briefly before, a server device could have the capability to itself initiate a call to a specified user telephone when some specified condition occurs. For example, the server could call the telephone after five calls have been received since the last time the user checked the server. Or it can dial the user when a particular expected call has arrived. Or it can dial the user based on some more complex set of conditions that the user defines to establish the circumstances under which he or she does or does not want the server device to automatically initiate a call to his or her telephone. If the server is set to automatically signal the telephone whenever a call comes in, and if the telephone has some of the paging-type functionality recently discussed, then the server itself, in effect, becomes a user equipment-based paging service.

Also, a telephone with the functional capability of receiving an emitted telephone number over the connection from a server and strong that number in memory for later redial can easily comprise a facsimile machine, a personal communications system, a personal computer, a personal digital assistant, or any other device which can be logically embedded into a single unit that includes this functional capability.

In short, the number or numbers which a primary telephone user needs in order to make a call or series of calls may reside in a telephone directory, with a directory assistance operator, on an answering machine or caller ID box, in an electronic or voice message, on a personal computer in the office, on a piece of paper on the secretary's desk, with another user of the telephone system, on a pager display, and in many other settings not explicitly noted here as examples. In all of these cases, if the primary user is not physically at the same location as the person or device which has the desired phone number, then the user is almost always required to contact the person or device where the number does reside, make a physical written notation of the number, and then manually enter the number into the telephone in order to complete a call. While driving a motor vehicle, this is unsafe. For a disabled individual, this may be very difficult. In many other situations, particularly involving multiple calls, this is highly inconvenient and time-consuming. The arrangement disclosed herein obviates the need to ever make a written record of telephone numbers prior to dialing, by enabling the telephone user to download such numbers into the memory of his or her telephone from a virtually limitless number of potential sources, in a highly dynamic way, and to then dial those numbers directly from the telephone memory at will.

The arrangement disclosed here in all cases frees the phone user from the task of manually entering telephone numbers into memory (aside from the entry of ordinary frequently-dialed numbers), and reduces and in some cases eliminates the number of keystrokes generally required to use a telephone. The entry of a telephone number into memory as described herein is controlled not by the primary user, but by a remote number source (server) which downloads one or more numbers to the primary user's phone memory without any manual action on the part of the primary user. This enables the primary user to receive and record phone numbers in a totally hands-free manner. Further, the dialing of such numbers can be achieved by a simple memory recall of one or two keystrokes, rather than by the more cumbersome entry of a full seven-or-ten digit phone number. Coupled with voice processing and recognition techniques, memory recall can be achieved without any keystrokes at all. In addition, this invention potentially enables dozens of phone numbers to be downloaded to the primary user's phone in a matter of seconds, whereas such a task would take many minutes and involve the suspension of other activities such as driving a car, if the primary user was required to jot down and then dial such numbers manually as at present. It also greatly facilitates phone use by individuals with physical disability.

BRIEF DESCRIPTION OF THE DRAWING

The invention will be described with respect to a drawing in several figures, of which.

DETAILED DESCRIPTION OF THE INVENTION

Figure 1:
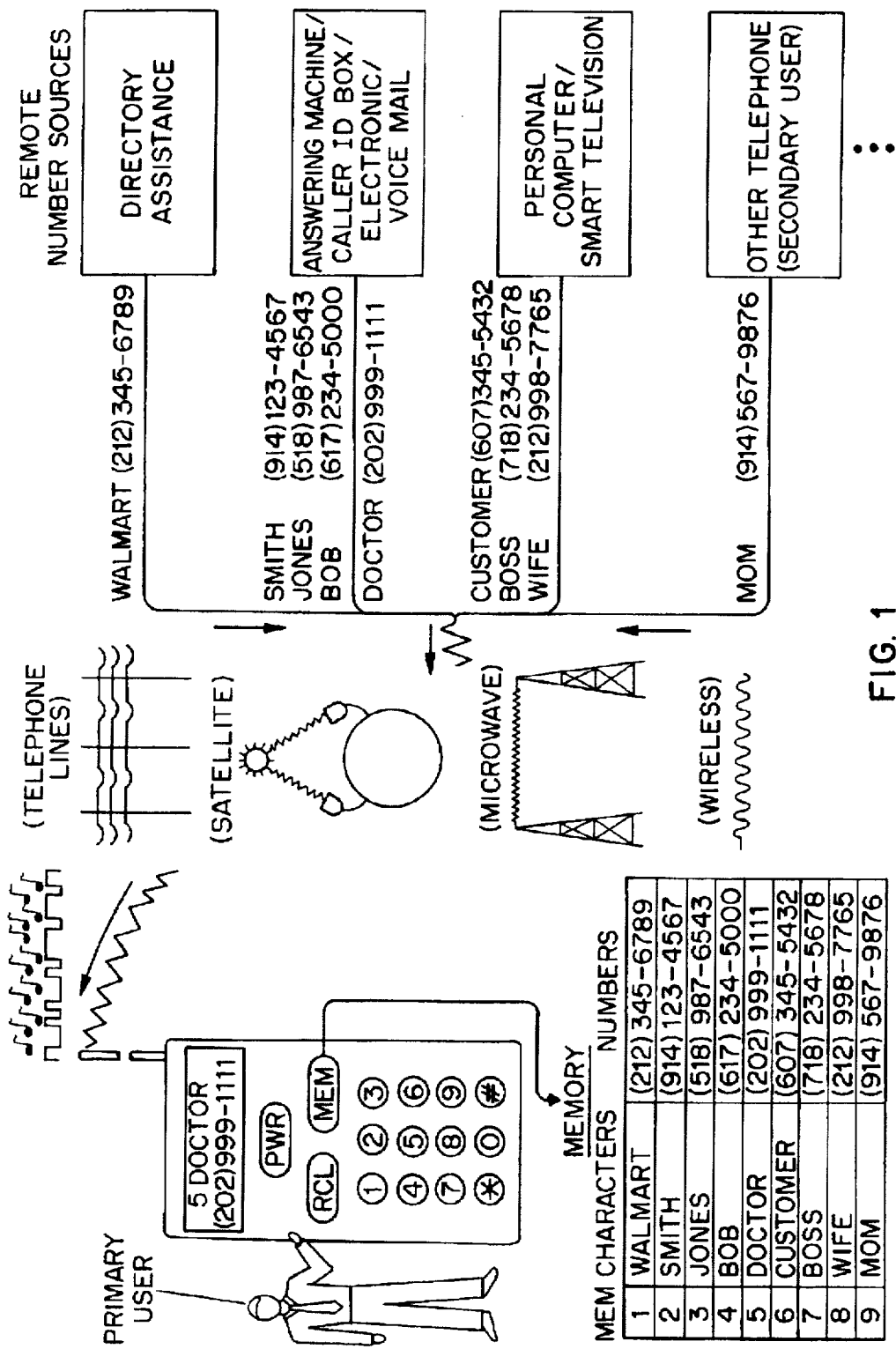
FIG. 1 illustrates the overall scope of the invention, including the "primary user" and his or her telephone, examples of various "remote number sources" and devices (servers) from which this user can automatically obtain telephone numbers, and the general connection among all of these via any standard switched telephone network.

FIG. 1 illustrates the overall scope and key features of the system. To the left of the figure (and most subsequent figures) is the primary user. This user has a telephone containing an internal memory for storing phone numbers and possible associated character information, and a display screen which in this illustration shows one selected number. Of course, the display screen can be arranged in many different ways. Residing in the phone memory, illustrated at the lower left, are nine telephone numbers (numbers) and character strings (characters) that the user has automatically downloaded into the phone's numbered memory locations ("mem") from the variety of "remote number sources" and devices (servers) shown to the right of the drawing and discussed below. The user can dial any one of these stored numbers using a standard memory recall. The downloading takes place through standard digital, touchtone (DTMF) or other signalling methods. Toward the upper left, a digital pulse and a series of musical notes signify digital and touch-tone signalling. These signals are transmitted to the primary user's phone over a variety of transmission devices, such as telephone lines, satellite communications, microwave communications, wireless spectrum communications, and other established transmission media (e.g. coaxial cable), in varying combination, as part of a standard, switched telephone network. The source of phone numbers can vary, though the four remote number sources illustrated are a directory assistance operator (who is sending the necessary signal to download the number for the Walmart store), a standard telephone answering machine, caller ID box, or voice/electronic mailbox (which has recorded and/or electronic messages from and is sending the numbers for Smith, Jones, Bob, and the doctor), a personal computer or smart television (into which the primary user's secretary has entered numbers for a customer, the boss, and the primary user's wife, all of whom want the primary user to call them), and the telephone of another (secondary) user (in this case, the primary user's mother, who is downloading the number where that user can reach her later in the day). The dots at the lower right indicate that this is merely illustrative, and that other devices can be conceived which would fit equally well within the scope of this invention. For example, the remote number source can easily be the server in a paging service, wherein the numbers downloaded into the phone from the paging service server can be used directly from the phone's memory for recall and signalling purposes.

While this and most later illustrations depict the transmission and storage only of telephone numbers and associated character strings into the primary user's telephone for later redialing, the range of such transmitted and stored information providing a callback number and identifying the caller and the purpose of the call can easily be expanded to encompass electronic mail and other forms of textual message, voice mail and other forms of audible sound associated with the message, facsimile information, pictorial icons, and video information—in short, enhanced user information—as will be described more fully in connection with FIGS. 15 and 16. While the connection shown in this and later illustrations is a standard telephone connection, this type of telephone number and related identifying information transfer can easily take place over, say, a narrowband or broadband ISDN link, or a broadband link of any bandwidth. With these higher-bandwidth connections (which may be desirable for more data-intensive enhanced user information transfer), the telephone number and related identifying information can be sent over a data channel while the voice conversation is conveyed over a voice channel. While the primary user is shown in this and later illustrations to have a telephone, a telephone with the functional capability of receiving an emitted telephone number over the connection from a server and strong that number in memory for later redial can easily comprise a facsimile machine, a personal communications system, a personal computer, a personal digital assistant, or any other device which can be logically embedded into a single unit that includes this functional capability. While the illustrations depict telephones with an ordinary manual keyboard, it is advantageous and facilitates hands-free use of this invention for these telephones to also contain an optional "voice keyboard," allowing voice intonation of the name of any alphanumeric or function key to have precisely the same effect as if the corresponding key was pressed on the ordinary manual keyboard. This voice keyboard would be "trained" to recognize one vocal signal corresponding precisely to each keyboard key, from the user of the telephone. While the illustrations show telephone number information transmitted in DTMF or other coded form, it is also possible, for example, to transmit digits and (even alphanumeric characters) in voice form, if a device in the system is fitted with a voice recognition device that translates numbers intoned by the caller into machine-readable digits that can then be used by the primary user's telephone for subsequent redial (and storage or output display of coded alphanumeric information).

In this illustration, each phone number is simply downloaded into the next available (empty) memory location, and the memory used for this arrangement is the same memory used presently for memory number storage in existing phones (with added space for an identifying character string). Other approaches could also be used, however. For example, the primary user could tell the number source or the telephone which memory location a particular number should be entered into, and this memory location designation could then be part of the information signal or packet sent from the remote number source to the primary user's telephone, or supplied by the primary user's telephone itself. Or, the remote number source can itself direct the storage of numbers into particular storage locations. Telephone memories may be designed with a separate area for this type of dynamic, remotely controlled storage, or they may be designed so that the remotely-transmitted numbers can occupy the same storage areas as frequently-called numbers directly entered by the primary user on commonly-available telephones. In a more sophisticated "random access" system, the primary user can utter a voice pattern which is stored in association with the number. When the user again utters the same pattern at a later time, that associated number can be called up and positioned for signalling without the user ever having to manually contact the keyboard and without concern for which memory location stores the telephone number. Or some other item of enhanced user information (e.g., a simple character string) can substitute for or supplement the role of this voice pattern to enable such random access.

In this and later illustrations, phone numbers are also displayed as an area code plus a seven-digit number within a local exchange. Of course, the phone would need a means to avoid signalling an area code for an in-area call, and would conversely need to place a "1" in front of the full number for a long-distance call. One means to accomplish this is to store an area code in the phone corresponding to the phone's own area code, to match this area code against those of incoming numbers, to trim the area code from an incoming number in the same area code, and to place a "1" in front of numbers representing out-of-area calls. Similar number processing methods could be used, for example, to accommodate international dialing digits and any prospective modifications to the NANP. If codes are introduced that cause a pause of several seconds between the dialing of two digits, this system could also accommodate the transfer, storage and redialing of telephone numbers with extensions, wherein the main number is dialed, a pause occurs to give a DTMF-responsive device necessary time to be activated at the receiving end, and the remaining extension digits are then dialed to connect to the desired extension via the DTMF-responsive device. The resumption of dialing could be based on an elapsed time, a user commend to resume, or in response to a signal from the device being called that dialing may be resumed.

It will be appreciated that it is helpful to employ a number verification signal to the server over the connection, with the server emitting a verification confirmation signal to the telephone over the connection, said confirmation signal indicating that the telephone number sent by the server has been properly received by the telephone.

Figure 2:
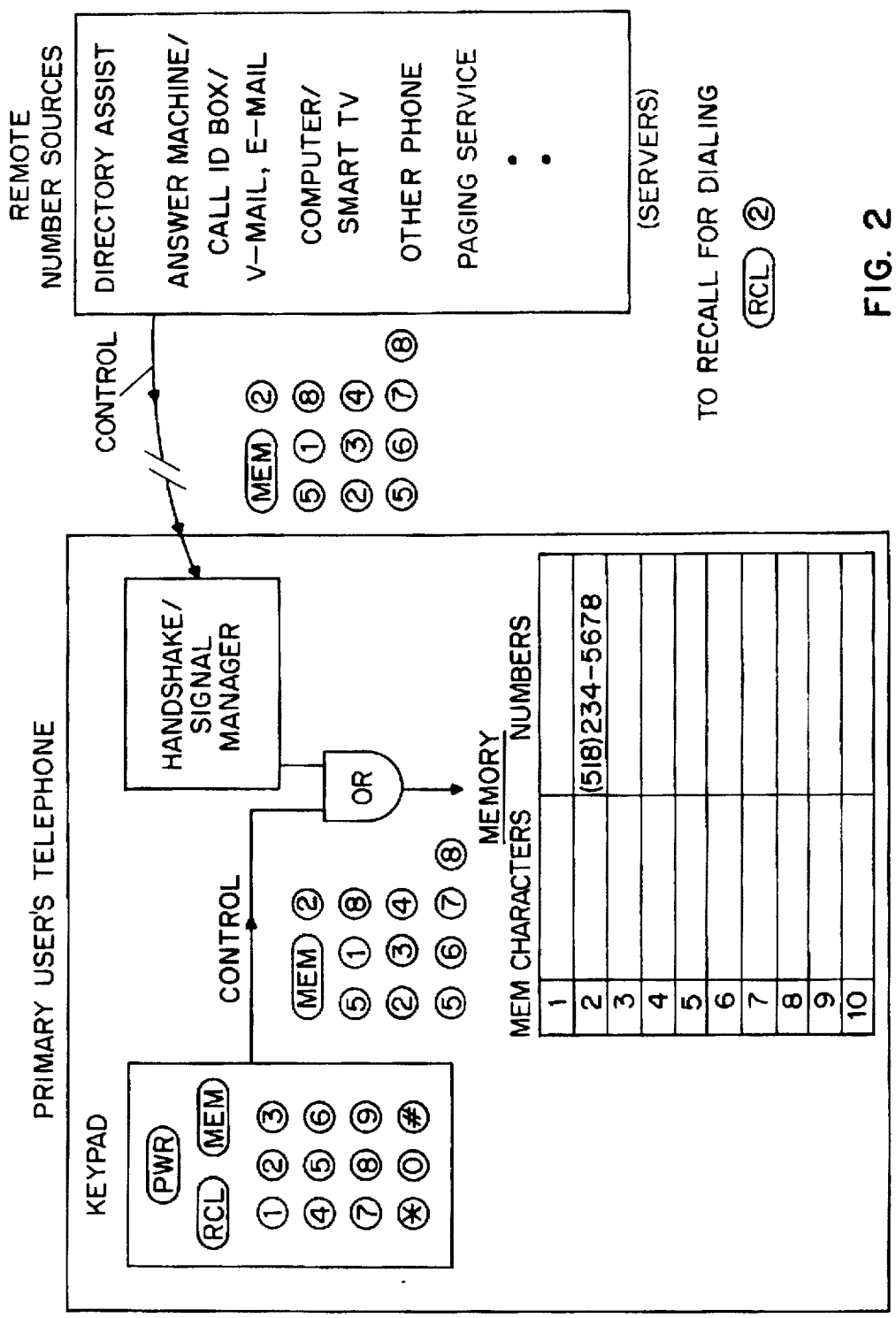
FIG. 2 illustrates how control over internal memory of the primary user's conventional telephone is modified in order to be able to receive number and character information from remote number source devices, so as to enable the remote number source, rather than the primary user, to control number entry into the phone's memory.

FIG. 2 depicts the keyboard and memory of the primary user's telephone, as well as a "handshake/signal manager" that contains the critical hardware and/or software required to allow remote downloading of the telephone's memory by a variety of remote number sources. Normally, the storage of telephone numbers (and optionally, of character codes and other identifying information, not depicted here) into memory is controlled by the user's keyboard. (Most keyboards have more function keys than are shown here. The ones shown are sufficient to illustrate the system.) For example, to enter the number (518)234-5678 into memory location number 2, the primary user might ordinarily push the key sequence MEM 2 5 1 8 2 3 4 5 6 7 8. Importantly, however, the same number is downloaded into memory from a remote number source, rather than by the primary user's operation of the keyboard. It is necessary therefore, to allow the remote number source to gain control over entry of data into the phone's internal memory on precisely the same terms that the primary user can control memory entry through the keyboard. Thus, the phone needs a simple switch (labelled "or") that determines whether the phone is taking its command and control signal from the keyboard or from an external source, as well as a hardware or software device, the "handshake/signal manager" which establishes and controls digital communication with the remote number source and ultimately allows the remote source to gain control over the phone's memory functions.

Figure 3:
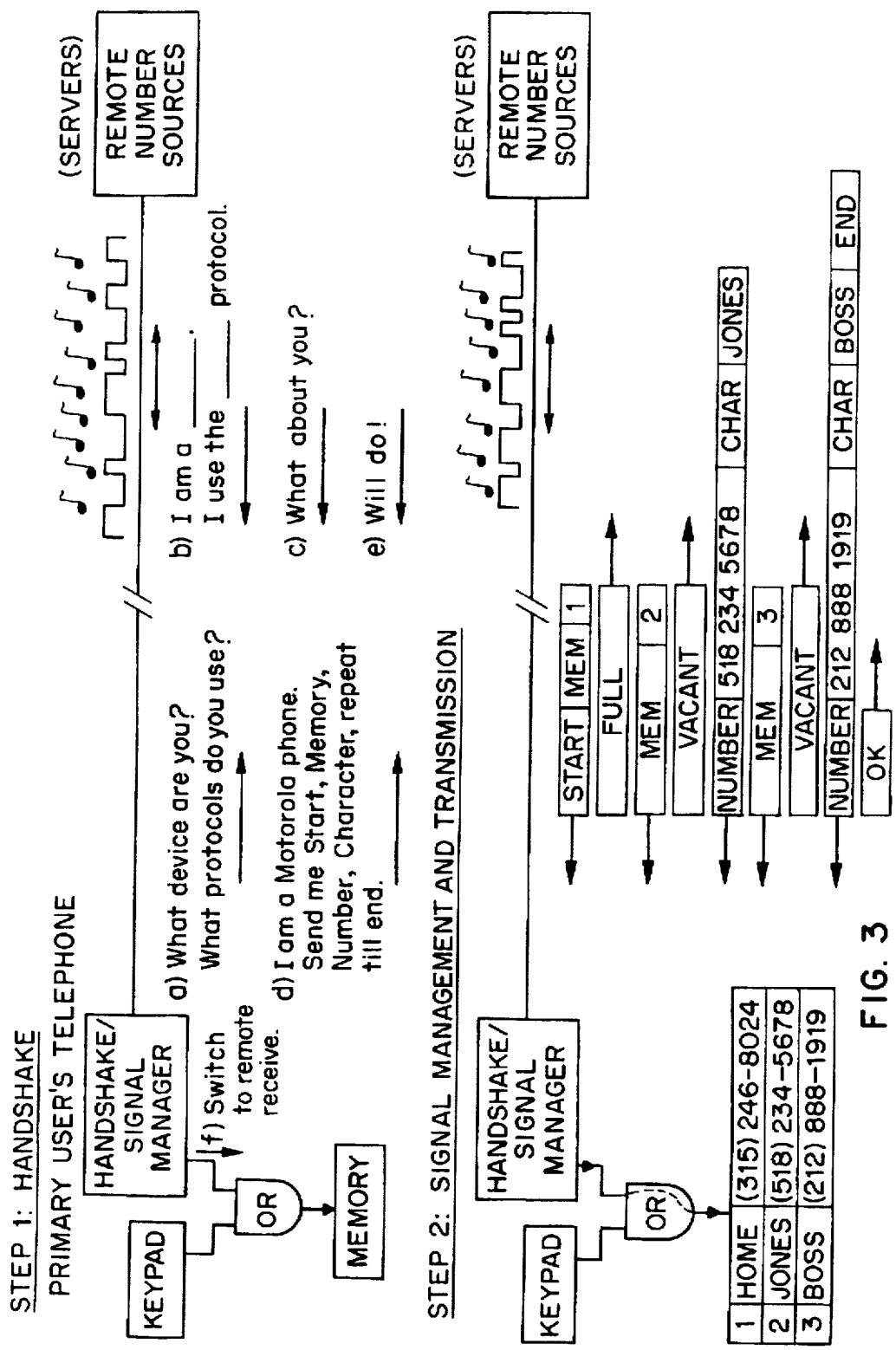
FIG. 3 illustrates the type of communications sequence and information packets that are exchanged between the primary user's telephone and the remote number source to implement the basic invention, and the overall operation of the "handshake/signal manager" that allows for remote control over the entry of numbers into the phone's memory.

This "handshake/signal manager," which is ideally designed as part of an application-specific integrated circuit or as part of the software of a processor, forms part of the telephones and other devices as discussed below, and combines two primary technical functions, as illustrated in FIG. 3.

First, the primary user's telephone must establish a recognizable dialogue with the remote number source, so that both are following the same protocols in communication and properly recognizing the signals and information being sent back and forth. Telephones and remote number sources conceivably produced by different manufacturers with somewhat different operational parameters, need to find some method of communicating properly with one another. This is referred to as the "handshake." A similar "handshake" or "polling" interaction is used, for example, to establish communication among a wide variety of facsimile machines, and among various types of computer modem and related communications hardware and software. These polling signals are familiar to anyone who has ever heard the tone on the other end of the telephone line when dialing up a facsimile machine. Thus, using the same components and methods that are used to establish facsimile, modem and related communications, the primary user's telephone exchanges a series of polling signals with the number source, so that a proper communication can be established between the two devices.

Second, once proper communication has been established between the devices, the "or" switch gives control of the primary user's telephone to the external number source, which may then send precisely the same sorts of control signal to the memory that the user ordinarily sends directly from the keyboard. This "signal manager" may use the same components and methods that are used, for example, when a person calls his or her home telephone answering machine, punches in a special code that provides remote touch-tone control over the answering machine, and then by a series of touch tones can direct the machine to play back messages, record new messages, rewind or fast forward the tape, and many other options. Each command and control signal that the user sends while remotely controlling the answering machine has precisely the same effect as if the user were standing right next to the answering machine and had physically pressed one or more buttons on the answering machine itself. The same methods and devices that are used to remotely control an answering machine (and, e.g., a thermostat) are used to control the primary user's telephone from a remote location, and particularly, to direct telephone numbers (and optional character and other identifying information) into the phone's memory for later use in memory recall dialing. Once the number has been stored in memory, it does not matter whether it initially came from the keyboard or the remote source. In either case, a simple memory recall, involving two keystrokes in this illustration (RCL 2, lower right in FIG. 2), will recall the number for dialing. As discussed later in connection with FIGS. 12–14, the use of various voice processing and recognition techniques can simplify this process even further by eliminating the need for the primary user to enter any keystrokes whatsoever when recalling an emitted number from the phone's memory. Further, as will be discussed, this system greatly expands the utility of even the most rudimentary voice processing and recognition techniques.

FIG. 3 further illustrates how the handshake and signal management of the primary user's telephone might take place. Step 1 is the handshake to establish communication. In a), b), c) and d), the primary user's telephone and the remote number source device poll each other in a handshake sequence to determine what type of device they are communicating with at the other end, much like the exchange of audible tones that are emitted when two facsimile machines or modems establish communication. Once the protocols for communications are settled, e), the handshake signal manager activates the "or," f), to switch to receive memory commands from the remote station and remote digital control of the primary telephone can begin.

Step 2 involves signal management and transmission, which is when the actual numbering information is transmitted. Many different formats for communicating message packets can obviously be employed. In the format shown here for illustration, the remote device begins by sending a START code followed by MEM 1, which is a request to place a number in memory location 1. The primary user's phone replies with FULL, indicating that there is already a number (HOME) stored in that location. The remote device then attempts MEM 2 and determines that it is VACANT. At that point it sends a function code NUMBER indicating that the signals to follow should be interpreted as the actual phone number to be stored in memory location 2, followed by 518 234 5678, the number itself. Then, the function code CHAR precedes an (optional) character string JONES, which accompanies the number into a memory location 2, expanded to hold character information. The sequence is repeated again for other numbers (BOSS in the illustration), until an END signal is sent from the remote source to the primary user's phone. At that point, an OK from the primary phone establishes successful completion of the transmission. Memory recall for dialing thereafter follows the same method as always. Note that this is not unlike the sequence that is used in a paging system to download a number and character information from a paging system server to a pager, but it operates from many different types of end-user equipment.

Figure 4:
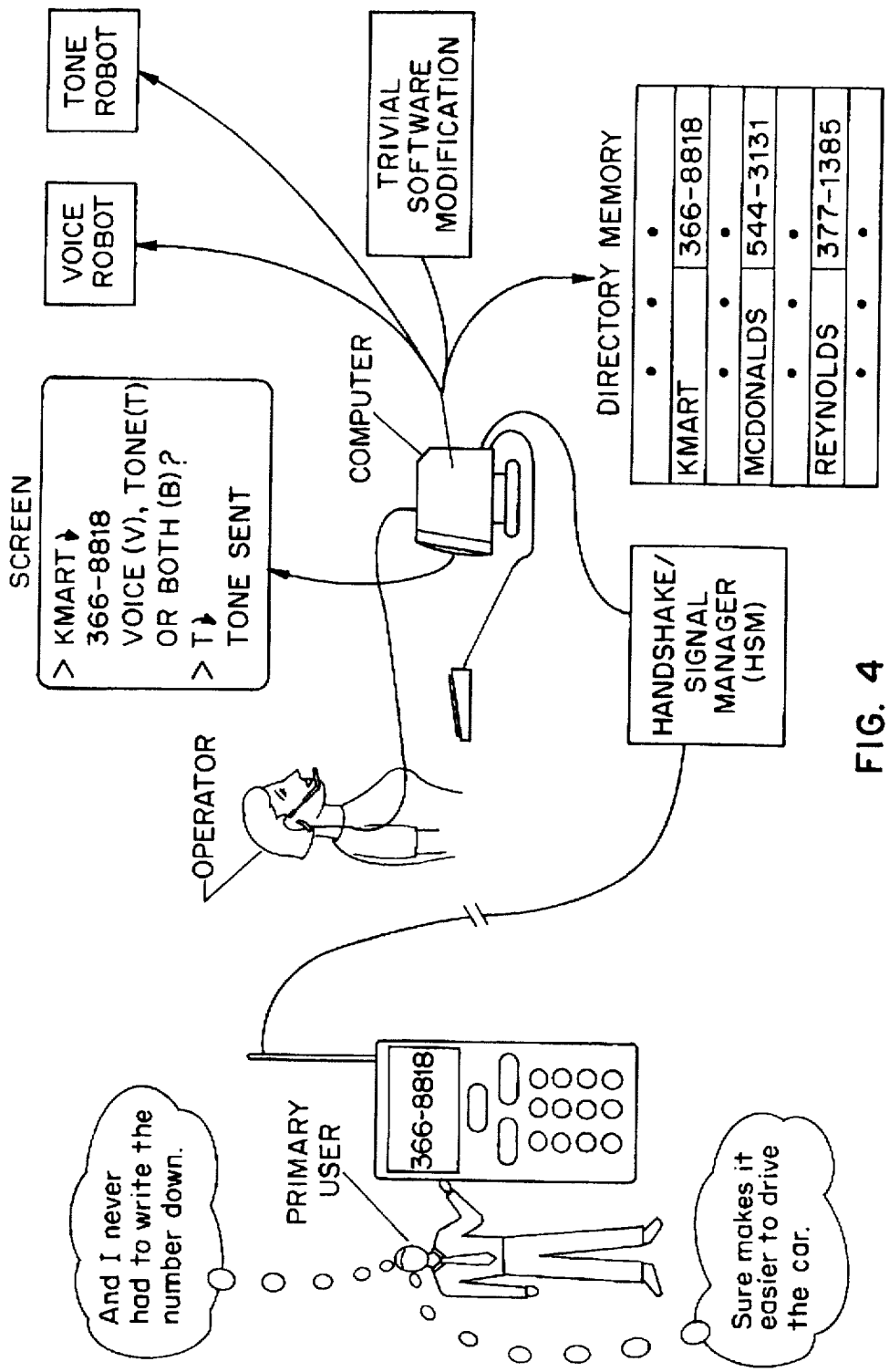
FIG. 4 illustrates appropriate modifications to existing directory assistance services to allow for remote transmission of telephone numbers to the primary user's phone memory, as well as the general usage scenario for this application.

FIG. 4 illustrates the straightforward alteration required for directory assistance application of the system. Current directory services already operate from a computer containing a directory in its memory, which is also connected with a voice robot that recites the digits "one," "two", "three," etc. Based on the database entry retrieved for a particular phone number, the appropriate digit vocalizations are combined and relayed in voice form to the primary user as a telephone number. Among the devices required for this invention at the directory assistance station are a straightforward "tone robot," as well as the handshake/signal manager (henceforth, HSM) discussed in FIG. 2 and FIG. 3. The tone robot substitutes appropriate touch tones for the vocalization of individual digits and serves precisely the same function in the overall directory assistance system as a voice robot. The HSM, as discussed above, performs the polling/handshake sequence to establish digital communications with the primary user's phone at the other end of the connection, and then packages and sends these tones out to the primary user in appropriate fashion (optionally including character strings), following the types of interactions illustrated in FIG. 3. Again, this type of interaction is commonplace in computer-to-computer, fax-to-fax, and other communications. With appropriate memories added to the directory assistance station, this identifying information can contain a full combination of character, sound, facsimile, pictorial and video information. Finally, in a simple variation, the operator can choose whether to send a voice number, a tone number, or both.

A very similar system can also be used to advise a caller that a called number has been disconnected and changed to a specified new number by transmitting that new number with other, optional accompanying information, after a call to the disconnected number causes a lookup of the associated newly-activated phone number from a newly-activated phone number memory containing such numbers. It can also be used to advise a caller that further information can be obtained by calling a different, specified number, by similarly transmitting that "further information" number with other optional information.

As a further variation, if the enhanced user information stored in association with telephone numbers in any of these directory assistance applications has an associated password code as well, then the person to whom that number refers, by supplying the correct password code, can uniquely customize the directory assistance information associated with that person's own phone number. In effect, this could enable user-customized, on-line, real-time, interactive, "yellow page-type" advertising directories, and similar variations of telephone directories. In connection with the "further information" application, this could establish a phone-based advertising service wherein various advertisers provide telephone numbers to the service, and control information about themselves provided in association with their telephone number, to people who call into the service for information. Obviously, the entity maintaining such directories may charge a fee to a caller so-customizing this information, similar to charges for advertisements in yellow pages, publications, etc.

As another variation, the primary user's phone can be fitted with a voice processing device that translates vocally intoned numbers into machine-readable digits that can be used for subsequent redial.

Figure 5:
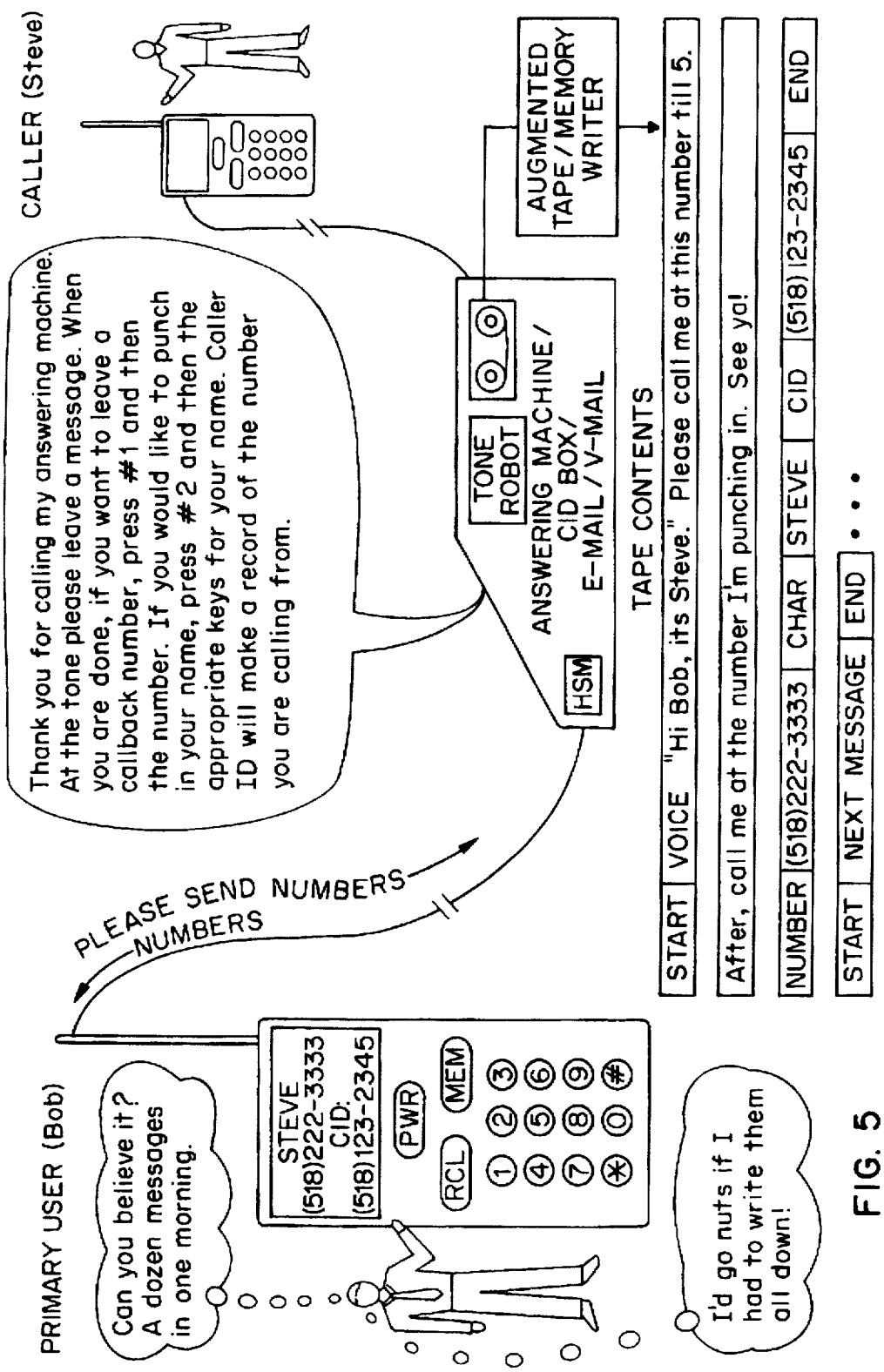
FIG. 5 illustrates appropriate modifications to existing answering machine/caller ID boxes as well as voice mail and electronic mail applications to allow for remote transmission of telephone numbers to the primary user's phone memory, as well as the general usage scenario for this application.

FIG. 5 illustrates a straightforward variant of a telephone answering machine combined with caller ID capability. A caller (Steve) calls the machine and gets the usual voice greeting, message, but is also asked to punch in a number to which the callback should be placed, and to punch in some codes for his name, and is also advised that caller ID is operating. It is standard practice for answering machines to contain variable-length records with fields delimited by START and END, or similar codes. By augmenting existing tape or memory writing circuitry to create a few more codes, additional variable-length fields can be defined on the tape or memory to hold, for example, a phone number and a character code, and by straightforward extension, other sound, character, facsimile, pictorial and video information (i.e., enhanced user information). Thus, after leaving a voice message, the caller (Steve) in this illustration punches the necessary keys to add a callback number and character data to the tape recording on the answering machine, while caller ID sets up a field for the phone from which Steve is presently calling. Subsequent messages are similarly stored. As in the prior examples, the HSM handles any handshakes and signal transmissions required to establish and engage in digital communication with the caller's phone. A tone robot, similar to the one described in connection with FIG. 4, generates the actual tones sent from the answering machine to the primary user's phone, when the primary user sends a remote control signal to the answering machine asking it to download the numbers. Once the primary user (Bob) calls for messages and then requests the machine to send him the numbers, he receives the callback data directly into his phone as outlined in previous examples. Exactly the same process could be followed for voice and electronic mail applications. It is important to note (with the exception of more advanced enhanced user information transmission) that the caller (Steve) does not have to have anything more than an ordinary touchtone phone at his location, i.e., he does not need this invention at his phone to place information onto Bob's answering machine. All that matters is that Bob has the apparatus on his phone and answering machine. If Steve has already stored his own callback number into his phone's frequently-dialed number memory (say, in memory location 1), then he can avoid punching in the individual digits # 1 518 222 3333 and instead just punch in something like # 1 RCL 1 SEND (i.e # 1 telling the answering machine that a DTMF number follows and should be stored in coded form, RCL 1, recalling Steve's own callback number from memory, and SEND actually emitting the digits). And if the phone should have a voice keyboard, such manual keystrokes can be eliminated entirely.

While FIG. 5 illustrates the transmission and recording of a voice message, a phone number and a character string, it is again noted that any form of text, sound, facsimile, pictorial and video information can be readily transferred and stored in a parallel manner, though higher-bandwidth, ISDN-type connections may be desirable for some of this information—video in particular. And, of course, both the caller's and the primary users' phone would have to be modified so as to include such an advanced enhanced user information capability. As a variation, the answering machine or caller ID box can be fitted with a voice processing device that translates vocally intoned phone numbers and alphanumeric characters into machine-readable digits and characters for transmission in coded form to the primary user. Or, the primary user's phone can be fitted with such a voice processing device so that the vocally intoned digits and alphanumerics can be stored on the answering machine or caller ID box, sent to the primary user's phone, translated into machine readable form, and then used as the basis for subsequent redial.

Figure 6:
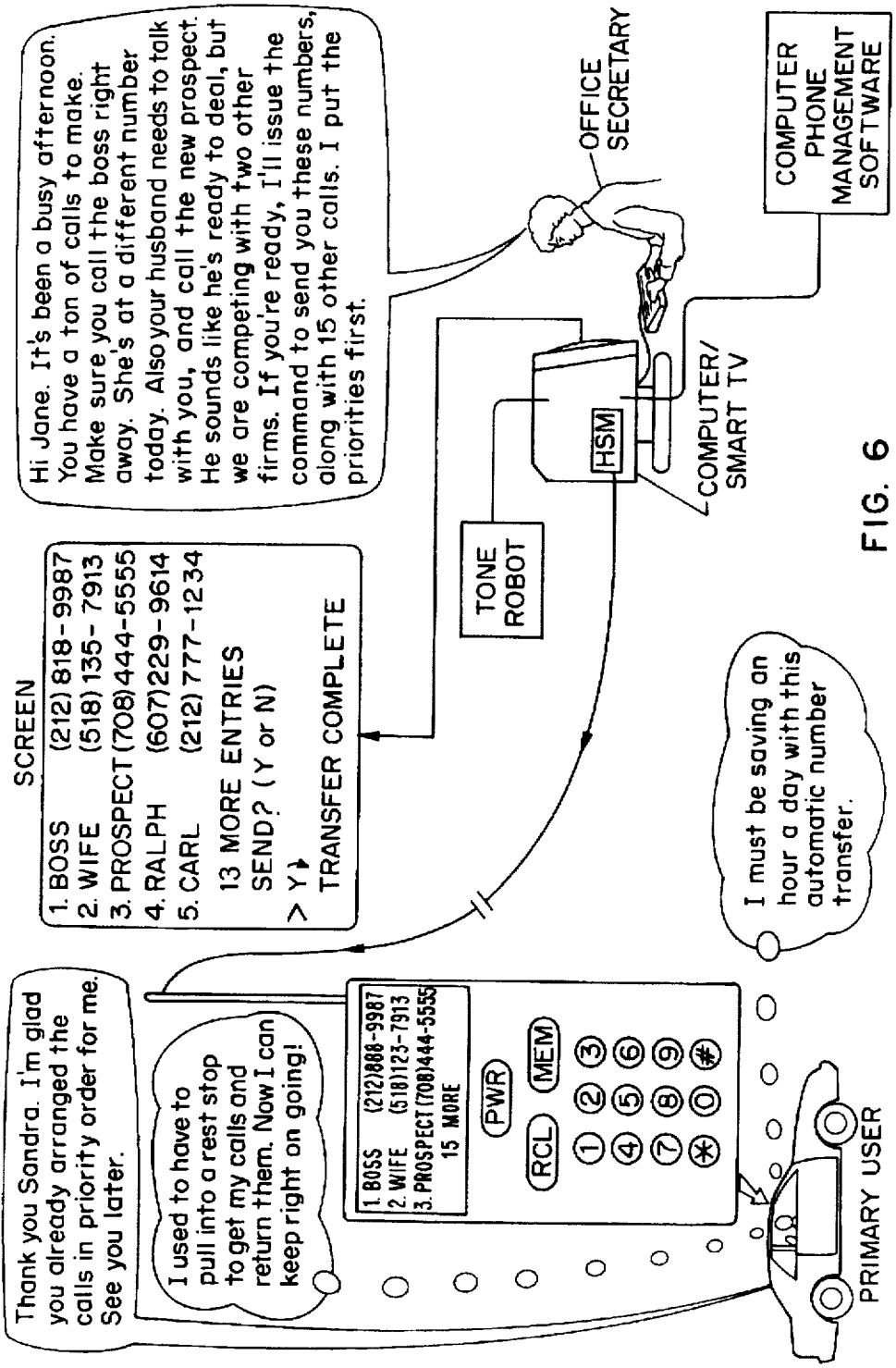
FIG. 6 illustrates appropriate modifications to a computer/smart television-based system to allow for remote transmission of telephone numbers to the primary user's phone memory, as well as the general usage scenario for this application.

FIG. 6 illustrates the straightforward alteration of a personal computer or smart TV to use such device as the remote number source. As with the earlier figures, the key component is the HSM to manage handshaking and signal transfer between the computer/smart TV and the primary user's telephone. Also needed is highly straightforward computer phone management software that the computer user can utilize to accumulate and prioritize phone numbers for later transmission. In this application, which is particularly advantageous in a business or office setting, the primary user's secretary, for example, enters all calls received over a period of time into the computer/smart TV, for later transmission the next time the primary user is in touch with the office. The computer phone management software allows addition, modification, deletion, re-ordering, and various other straightforward operations with respect to the phone numbers so entered. When the primary user asks for the calls to be downloaded, a simple keyboard command to transfer activates the HSM, which handshakes with the primary user's telephone to establish digital communication, and then engages in the necessary signal transfer with the primary user's telephone to transfer the phone numbers and related character information, as outlined in FIG. 3. Tones are generated by the same tone robot described in connection with FIG. 4 and FIG. 5. For people frequently out of an office and in transit, who need to return large numbers of phone calls, this application can be a very large productivity enhancement. If the personal computer or smart TV is also connected to an incoming call (a combination of the functionality of FIGS. 5 and 6), then it would be possible for this device to take caller identification information from both the keyboard (i.e., the secretary) and the connection (i.e., the calling party's telephone). This is particularly useful for downloading information stored in the caller's telephone into the personal computer or smart TV.

Figure 7:
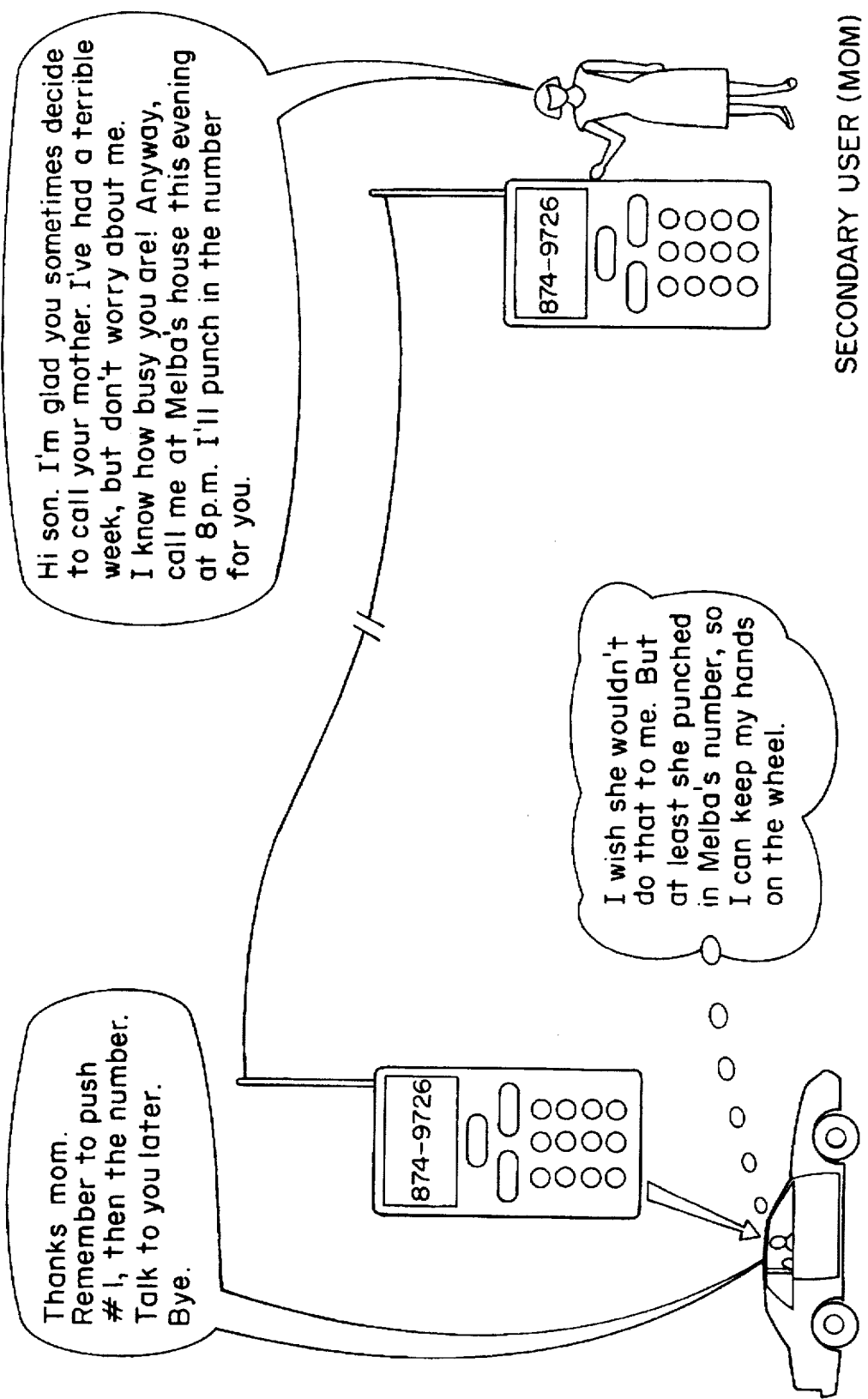
FIG. 7 illustrates how another ("secondary") user's touch tone phone without any of the modifications of this invention, can be used to allow for remote transmission of telephone numbers to the primary user's phone memory, as well as the general usage scenario for this application.

FIG. 7 illustrates how a secondary user's ordinary touch tone telephone, without any modification whatsoever, can be used to allow remote number transfer from that user's phone to the primary user's phone. In this illustration, "mom" sends to "son" the number he should call her at tonight simply by dialing in a series of touch tones. Here too, as in FIG. 5, it is important to note that "mom" needs nothing more than an ordinary touch tone phone to send the number to "son." Only "son" needs to have this equipment on his phone in order to receive the number from "mom." And of course, "mom" might already have stored her callback number into the frequently-dialed number memory, reducing the number of keystrokes she must make during the call. As a variation, if the either phone has a voice processing device, then digits and alphanumerics vocally intoned by the secondary user can be translated from voice into machine readable form for storage in the primary user's phone, and then used as the basis for subsequent redial.

Figure 8:
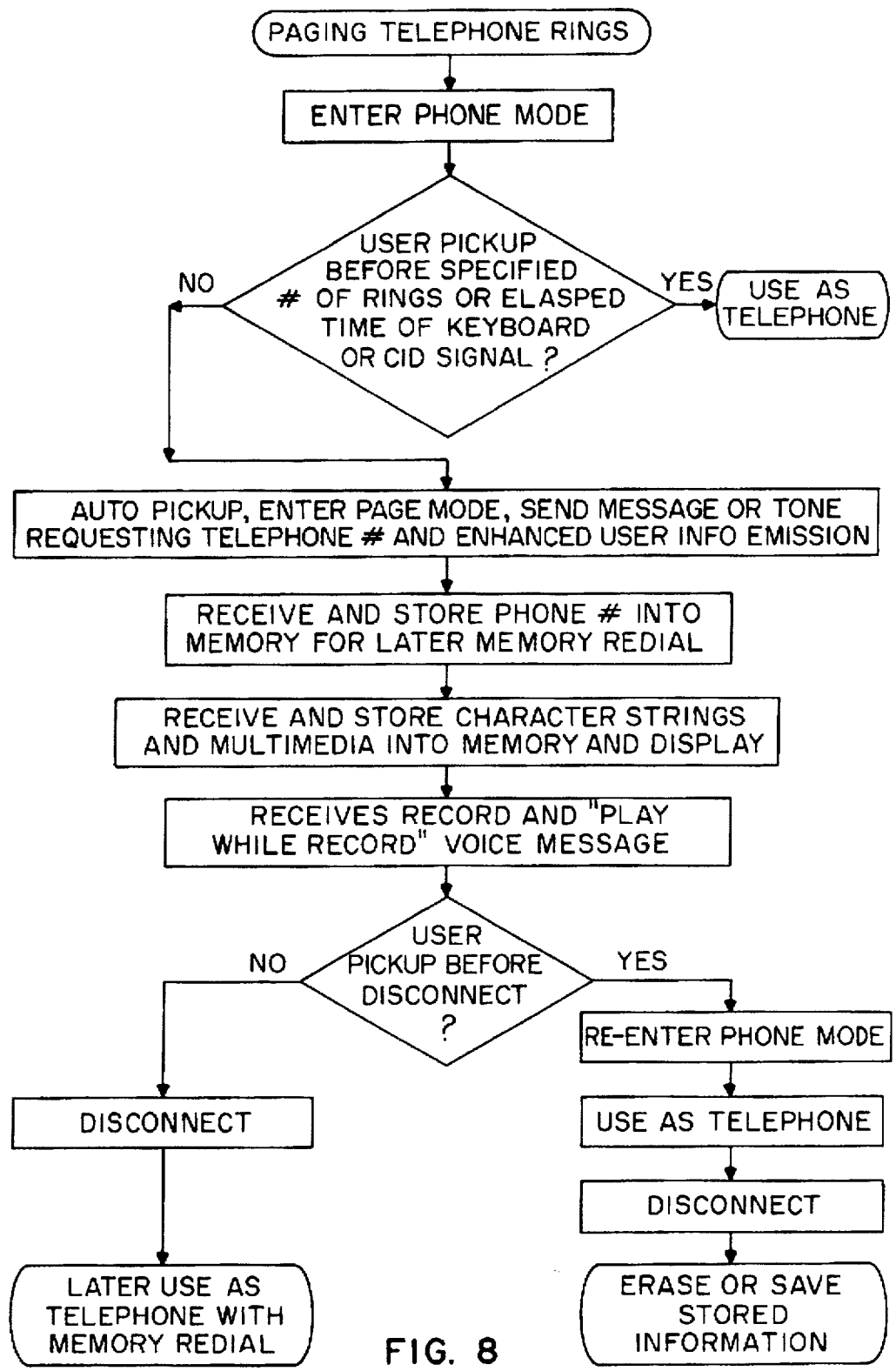
FIG. 8 is a flowchart illustrating possible operation of a device that combines through an ordinary switched telephone network the operations traditionally associated with separate telephone and paging devices, optionally incorporating answering machine and caller ID features as well.

While all of the examples cited thus far involve briefly suspending an ongoing phone conversation (often initiated by the primary user) to download one or more telephone numbers from a server at a remote location into the primary user's telephone, this approach is readily supplemented and made even more useful if the telephone can also act similarly to a more traditional paging device, with optional functions akin to those of answering machines and/or caller ID boxes, as illustrated FIG. 8. In this application, the primary user is always the call recipient. The HSM in primary user's telephone would optionally include or be supplemented by a "page/phone selection controller," which automatically picks up the phone after an automatic call pickup status condition has been detected, such as a specified number of rings (which could be "zero," i.e., which, like a pager, always picks up the call on detection of an incoming call, or non-zero), an elapsed time period (which could be "immediately," again, like a pager, or a finite time period), a command received from the keyboard, or the caller ID information associated with a call fitting a particular user-defined profile, and stores in the phone memory an emitted telephone number which can subsequently be used to perform a memory redial, and possibly character information provided by the incoming call. This information can even include a voice recording or other enhanced user information. An answering machine-type message on the phone, or a tone or similar indicator emitted by the phone to the server over the connection, can tell the caller or the server to transfer the phone number and other enhanced user information to the phone. If the primary user picks up the phone before the specified number of rings or elapsed time without commanding the phone to do otherwise from the keyboard, the selection controller causes the device to act as a telephone. If, however, the phone has been automatically picked up, the number may be displayed on the screen (perhaps supplemented by the in-progress recording of a voice message audible to the primary user through a speaker, the display of a pictorial icon, or something similar), and the primary user might optionally wish to pick up the call immediately, before the connection is terminated. If so, the selection controller would switch the paging phone back to telephone mode. In this instance, the paging phone performs similarly to a caller ID box or answering machine, where the user can pickup or not pickup a call depending on who is identified as the caller. Afterwards, the user could then choose to retain or not anything that has thus far been stored in the various memories in the usual manner for such devices.

As discussed, FIG. 8 combines telephone and paging functionality into a single device such that a phone number transferred to and stored in this "paging telephone" can be subsequently redialed from the telephone number memory, and optionally enhances this device with traditional answering machine or caller ID functionality. A phone device resembling a more traditional pager, absent a telephone, can instead be supplemented with an acoustical DTMF tone generator which emits tones based on the contents of the phone memory. In this variation, a phone number is received by the phone, and when the phone user wishes to return the call, he or she can pick up a separate telephone, establish a dial tone, and then use the attached acoustical DTMF generator to generate the acoustical DTMF tones corresponding to the number in the phone memory while holding the phone near the mouthpiece of the separate telephone. This also activates a callback without the need for ever dialing the telephone number, but does require access to a second phone that is separate from the primary user's phone. Again, while such DTMF tone generation capability responsive to telephone numbers received into memory does already exist for some pagers in paging networks, it does not exist on ordinary phone devices operating independently of a paging network.

Figure 9:
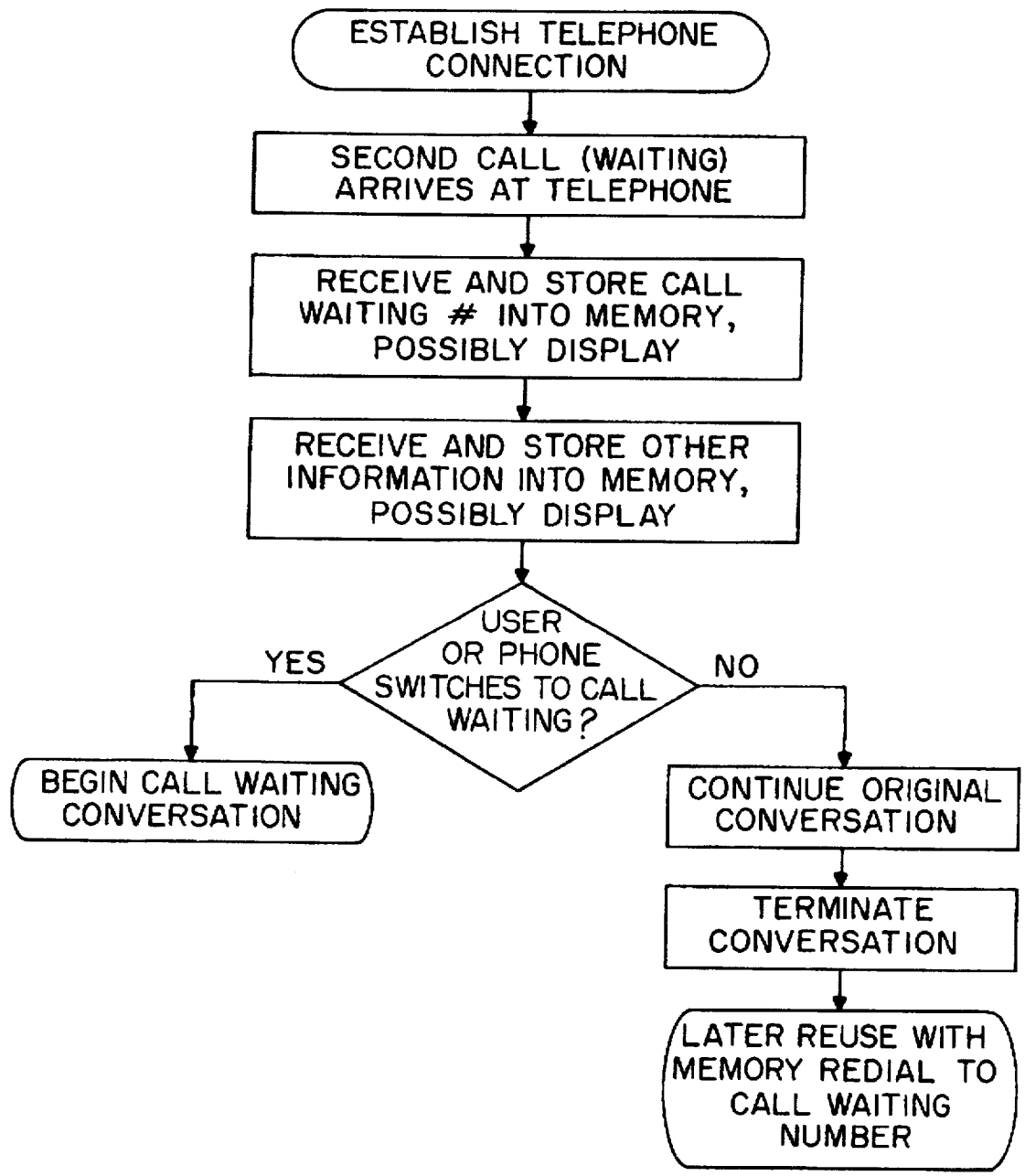
FIG. 9 is a flowchart illustrating a call waiting variation of the invention.

FIG. 9 flowcharts a call waiting variation of the invention. In this variation, a phone user might receive a signal indicating a call waiting, but would also receive a phone number emitted either by the waiting caller or by a caller ID system into the memory of his or her telephone, optionally along with other user-customized information indicating who is calling, including character, voice, facsimile, pictorial and video information, and/or a caller ID signal. This could enable the user (or the telephone, based on matching a caller ID signal to a particular user-defined profile) to determine whether or not to interrupt the present call to pick up the call waiting, and in any event, would once again enable the phone user to call that number back at a later time without having to write down or enter the number.

Figure 10:
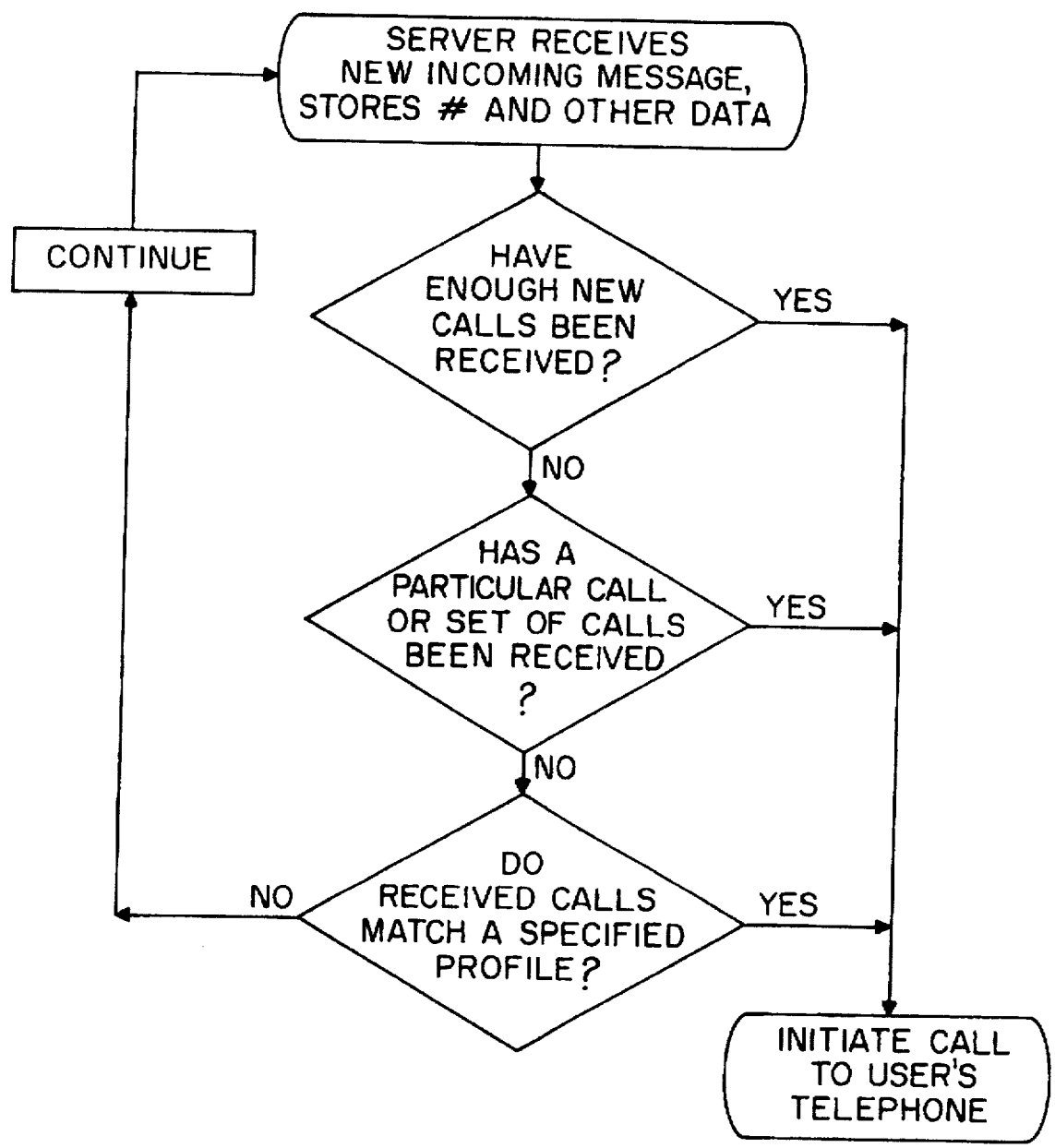
FIG. 10 is a flowchart illustrating initiation of a call by a serving device based on certain call initiation conditions.

FIG. 10 flowcharts some useful "call initiation" variations on answering machines and related server devices that send telephone numbers to the user's telephone. For example, a server device could have the capability to itself initiate a call to a specified user telephone (the telephone number of which is stored in the server) when some specified condition occurs. For example, the server could call the telephone after five calls have been received since the last time the user checked the server. Or it can dial the user when a particular expected call has arrived. Or it can dial the user based on some more complex set of conditions that the user defines to establish the circumstances under which he or she does or does not want the server device to automatically initiate a call to his or her telephone. If the phone user, for example, has the type of paging phone with automatic pickup as described in connection with FIG. 8, the user could receive messages at his or her home answering machine, office computer or similar server devices, have the phone numbers and other information from these messages automatically downloaded to a paging phone in the glove compartment of his or her car, and arrive back at the paging phone to find all of his calls already on this device, simply waiting to be dialed directly from the paging phone's memory.

An important variation of this invention combines the basic "caller to server to primary user" arrangement of FIG. 5 with the automatic call pickup features of FIG. 8 on the primary user's telephone and the automatic call initiation features of FIG. 10 on the server. Particularly, by setting the server to initiate a call to the primary user's telephone any time it receives a call (i.e., by setting the quantity of calls needed for server initiation of a call to be equal to "one"), and by setting the primary user's phone to automatically pickup an incoming call immediately and store the emitted number straight into memory without any intervention by the user, a user can establish his or her own paging service based completely on his or her own end-user equipment, and without any need whatsoever for a centralized paging service. The primary user's server acts just like a paging service receiving and forwarding callback numbers for incoming calls as they are received, and the primary user's phone acts just like a pager, storing callback numbers straight into memory as soon as they are received. Unlike in a paging service, these numbers can also be later recalled and signalled from the telephone's memory.

Of course a related variation of this invention also includes the situation where a pager in a more traditional, centralized paging service is combined with a telephone allowing memory-based signalling of telephone numbers in the pager's telephone number memory.

Figure 11:
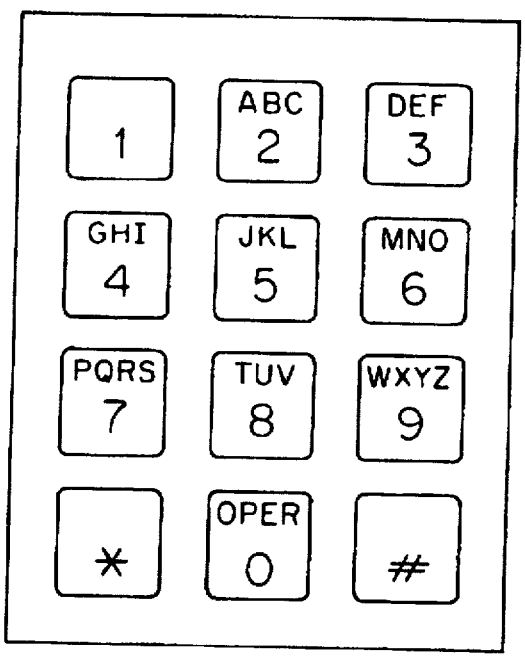
FIG. 11 illustrates a possible schema for sending character data associated with a phone number from a standard telephone keyboard.

FIG. 11 illustrates a possible schema or protocol for sending character data associated with a phone number from a standard telephone keyboard. While such character data is optional, it does add to ease of use, and is perhaps the most rudimentary form of "enhanced user information." If the sending source is a computer or other device with a full alphanumeric keyboard, character data can readily be sent without difficulty. However, in the event that the sending source is a telephone device with ten digits plus a few function keys, the transmission of character data is less straightforward. The schema in FIG. 11 is illustrative of one way to do this. Others can also be employed. This figure is intended less to propose a particular convention for character transmission from a telephone keyboard, than to demonstrate that the any of several schemas may be employed. In this schema, it is recognized that each numeric key from 2 to 9 on a telephone keyboard has 3 or 4 alphabetic letters associated with it. (7 has PQRS and 9 has WXYZ. All other keys 2 through 9 have three letters.) Each letter can be uniquely identified therefore, by its position relative to a given key (first, second, third or fourth position). Thus, by designating both a key and a key position, each number can be uniquely identified. Thus, two keystrokes are needed for each letter. For example, the name JOSHUA could be represented by the (position, key) pairs J=(1,5), O=(3,6), S=(4,7) H=(2,4), U=(2,8), A=(1,2). One can easily select a character code to signal the start and end of a character string, e.g., START=*1, END=*9. Again, while this precise schema could certainly be employed, so too could many others equally feasible schemas be easily employed by a skilled practitioner. For example, character codes are often entered into facsimile machines by placing a cursor at a particular position, and then toggling through a full alphanumeric alphabet, selecting a particular alphanumeric character to occupy the cursor position, and then moving to the next cursor position, i.e., to the next position in the alphanumeric string being entered, to repeat the toggling process. If these strings are stored in the emitting server's memory, then such processes, while cumbersome, need only be repeated once, rather than with each call, for information to be sent with every call.

At this point, we examine in more detail some significant voice processing variations. Recall that FIG. 2 illustrated memory recall and signalling from the primary user's telephone taking place via the manual entry of a RCL 2, which requires two distinct keystrokes by the primary user. Most of the subsequent discussion has assumed that memory recall is in fact effected by a small number of manual keystrokes. But the use of various voice processing and recognition techniques can obviate the need for any keystrokes whatsoever. Further, when used in conjunction with this invention, even the most rudimentary voice processing and recognition techniques can be quite usefully employed, as now illustrated by FIGS. 12–14.

Figure 12:
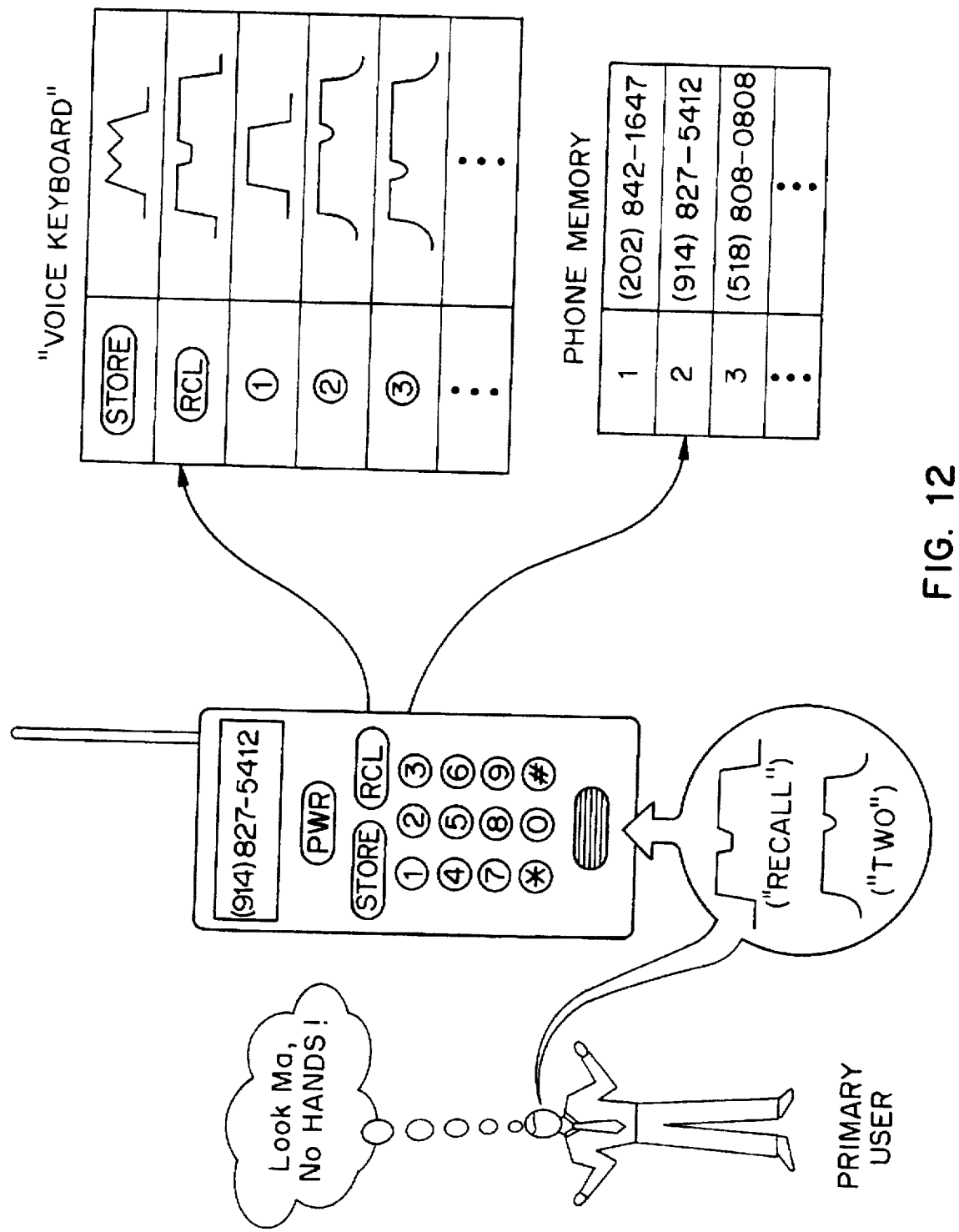
FIG. 12 illustrates a "voice keyboard" that eliminates the need for manual operation of the telephone even for recall and redial of telephone numbers transferred in this system.

For example, as shown in FIG. 12, the primary user might simply say "RECALL TWO" into a voice recognition device, which causes the contents of memory location two to be recalled and then dialed. In this example, the voice recognition device needs to be "trained" to recognize only about a dozen vocal signals (ten digits and a few function keys) from a single user (i.e., the primary phone user) to be fully effective, rather than a virtually unlimited number of vocal signals from multiple users that such a device may be called upon to recognize in other voice systems. Similarly, all of the telephone numbers to be retrieved are stored in the phone's relatively small memory via this system, limiting the required database search to the small quantity of telephone numbers in the phone's memory rather than to every phone number in the city, the country, or the world. Not only is the need for manual keystrokes eliminated, but the sophistication of the associated voice recognition and database retrieval system thus need not be nearly as great as that of other systems. The voice recognition device in this example, ideally, is a "voice keyboard" allowing voice intonation of the name of any alphanumeric or function key to have precisely the same effect as if the corresponding key were pressed on the manual keyboard. In this illustration, distinct vocal patterns are depicted as being stored in a voice keyboard. These patterns have been initially entered by the user at an earlier time in a "training" session which essentially amounts to providing the telephone with a record of how the user intones the names of each of the keys. When the user now says "RECALL TWO" into a voice device on the telephone, these intonations are matched against the information stored in the voice keyboard, and commands are executed as if the user had punched in precisely the same commands at the manual keyboard.

Figure 13:
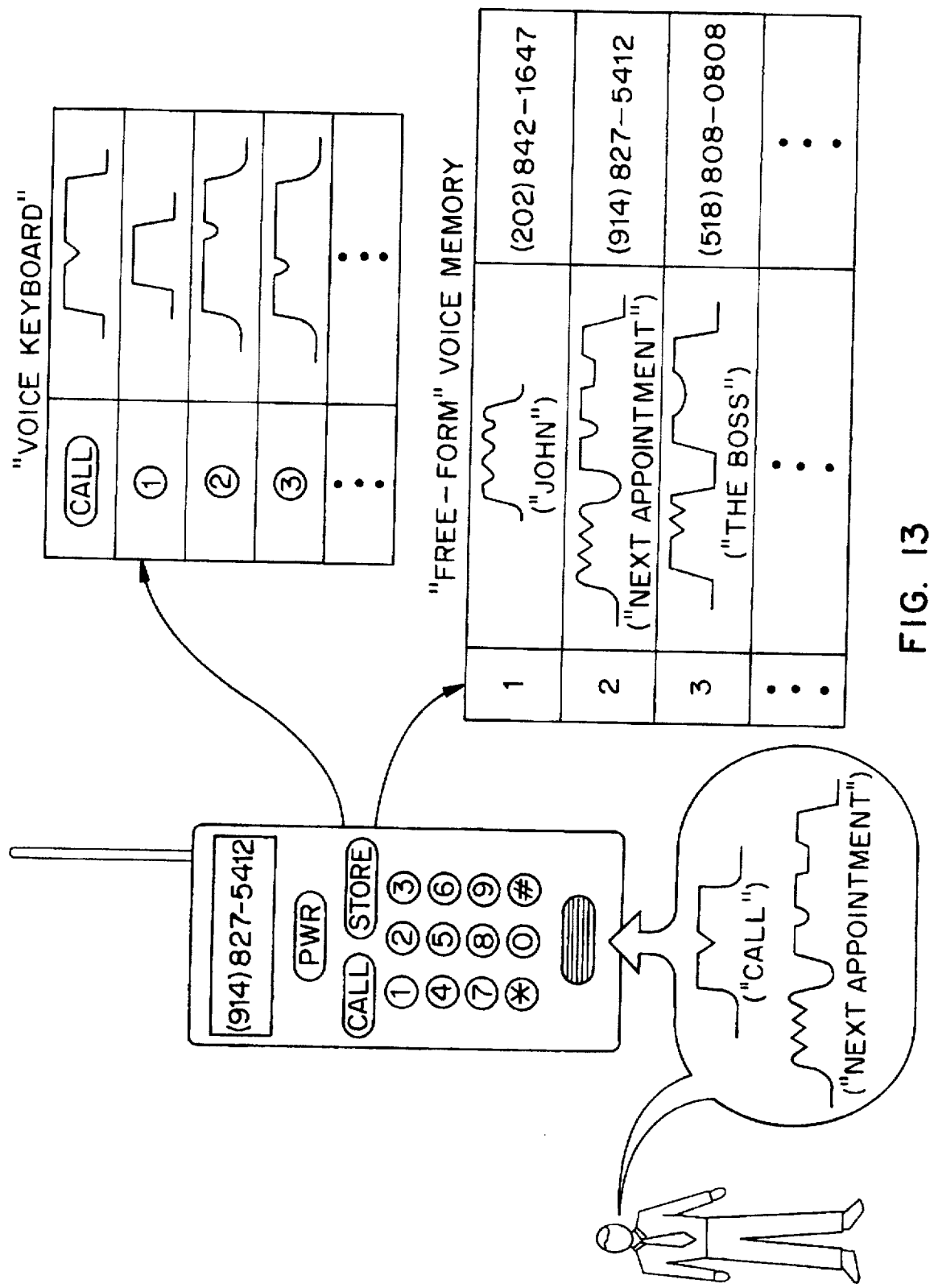
FIG. 13 illustrates a memory storage and recall system for telephone numbers transferred and signalled in this system, further based on the use of voice processing techniques.

FIG. 13 illustrates a random-access voice memory storage and recall scheme that obviates the need to be concerned about which memory location a particular phone number may be stored in. If the phone has a free-form voice memory and a means for matching free-form vocal patterns from a single user, the primary user might say "JOHN" or "NEXT APPOINTMENT" or "THE BOSS" just as John's telephone number or that of the next appointment or the boss is being transferred and stored into memory, and that vocalization could be stored in the free-form voice memory in association with that telephone number. When the primary user later wishes to return the call, a "CALL JOHN" or a "CALL NEXT APPOINTMENT" or a "CALL THE BOSS" could be matched with the stored vocal pattern, causing retrieval and signalling of the phone number associated with that pattern. Similarly to the discussion of FIG. 12, "CALL" would be matched against information in the voice keyboard and be recognized as a function key on that voice keyboard. "JOHN," "NEXT APPOINTMENT" or "THE BOSS" would be matched against information in the voice keyboard but would not be recognized as entries therein. So the system would next match these against information in the "free-form" voice memory, wherein it would indeed find a match. As a result, the associated phone number (in the illustration, the "next appointment" number, (914)827-5412) would be retrieved from memory and dialed. In addition to "trained" matching of precisely defined function and alphanumeric keys (facilitated by the "voice keyboard"), this requires direct matching of particular free-form vocal patterns uttered by the primary user, with free-form vocal patterns later uttered by that same user. In effect, the initial utterance comprises the "training" pattern and the subsequent utterances are then "matched" against the original. This is similarly a relatively rudimentary voice recognition task that narrows the scope of vocal utterances that need be matched, the range of users whose voices need be recognized, and the size of the database that need be searched for a match. In a similar type of random-access memory storage and recall scheme, some other item of enhanced user information (e.g., a simple character string) supplied by the caller or the call recipient can substitute for or supplement the role of this voice pattern.

Another variation might allow the caller to intone his or her telephone number (and perhaps simple alphanumerics) into the system, and to then have the system translate each vocalized digit into a machine-readable digit that can be used for subsequent redial from memory, in place of, say, transferring the number as DTMF digits. Depending on where in the system this "voice translator" is placed, it may, however, be necessary to recognize a limited number of voice signals from someone other than the primary phone user.

Figure 14:
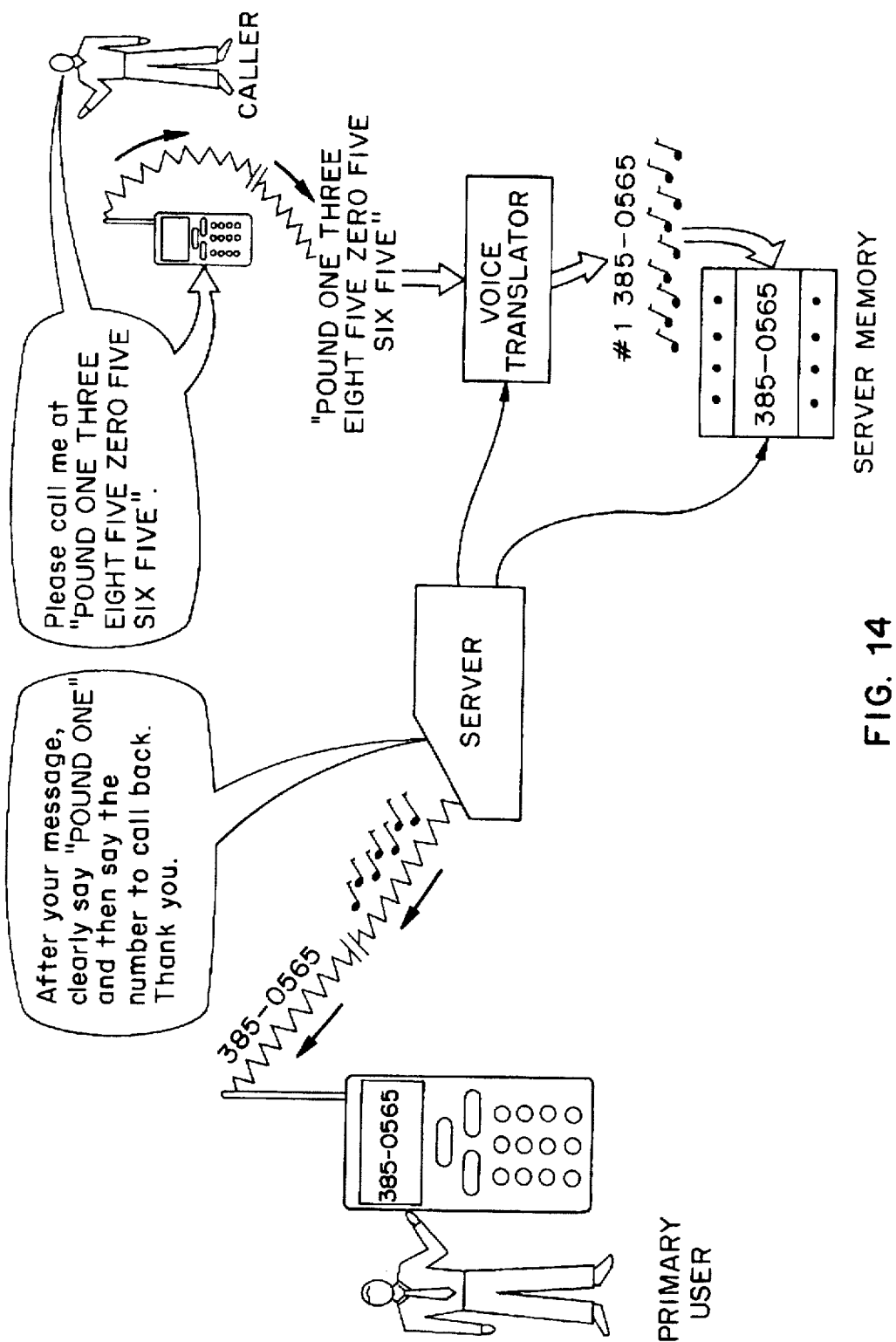
FIG. 14 illustrates the use of a voice translator enabling telephone number digits to be entered and transmitted in voice form and then translated into coded form for memory recall and signalling.

FIG. 14 illustrates this. Here, the primary user's server (e.g., answering machine, personal computer) has a "voice translator" device in addition to the usual server memory storing telephone numbers. The caller carefully enunciates "pound one three eight five zero five six five," and this is sent to the server over the connection. The voice translator processes this information and turns it into the machine-readable information #1 385-0565, which then causes storage of the phone number into the server memory in machine-readable form. Later, this can be further sent to the primary user and used as the basis for memory redial in the usual manner. While the "voice translator" is illustrated on the server, it can also be located on the caller's phone or on the primary user's phone, i.e., this translation can take place at any point in the process between the time the vocal signal leaves the caller's lips and the time the primary user is ready to recall and dial the number from memory. Similarly, with the translator on either of the caller's or the primary user's telephones, the caller could be in direct communication with the primary user's phone, absent the intervening server (e.g., as in FIG. 7, as opposed to FIGS. 5 and 6).

Finally, if the translator is on the caller's phone, then in effect the translator need be nothing more than the "voice keyboard" described in connection with FIGS. 12 and 13. This is because the caller could train his or her keyboard to recognize his or her intonations of various keys, and then, when he or she later recites the same intonations, they could be matched and signals emitted from the telephone as if the caller had pressed the precisely corresponding keys on the manual keyboard. However, in this instance, the "voice keyboard" is introduced as a modification to the caller's equipment—not the primary user's, wherein most of the other variations discussed require modifications only to the primary user's equipment. On the other hand, if the voice keyboard is on one of the primary user's devices, it will have to recognize vocal patterns from someone other than the primary user, and the "training" of this device becomes more difficult, i.e., this device must be more sophisticated insofar as its ability to respond to voice patterns of multiple individuals who may not be readily identifiable in advance.

Again, many of the voice processing techniques discussed here, by themselves, have precedent in existing art. But, their combination with the telephone number transferring capability of this invention is a significant variation of this invention, both simplifying the use of this invention and expanding the widespread utility of these voice processing techniques.

The various figures thus far illustrate the transmission and storage only of telephone numbers and associated character strings into the primary user's telephone for later redial. In all cases (excepting directory assistance, switch-based caller ID and call waiting), the secondary user (often the calling party) needs nothing more than an ordinary touch tone telephone in order to send telephone numbers effectively in conjunction with this invention, i.e., the calling phone needs no enhancements at all. Whether to obtain the upgraded equipment required to use this invention is solely the decision of the primary user. This, of course, greatly adds to the utility of the invention because it allows individual users of a switched telephone network to decide whether or not to use the invention as a matter of individual choice of consumer electronics, irrespective of what other users may or may not choose to do or what intelligence a phone company may or may not place into its network. But as earlier discussed in connection with FIG. 1, the range of such transmitted information identifying the caller and the purpose of the call can be expanded to encompass electronic mail and other forms of textual message, voice mail and other forms of audible sound associated with the message, facsimile information, pictures, and video information. This "customized caller information" variation has some important implications, and is now illustrated in detail by FIG. 15. Because the focus is now on the caller's phone (since we are looking at information designed to identify to caller to everyone else in the world), we now depict the caller rather than the primary user on the left side of the illustration.

First, a calling party who is conveying his or her phone number and related information does not necessarily have to manually punch in that information each time he or she makes a call. By including appropriate memories in the caller's phone, this information can be pre-programmed into the phone, i.e., the caller's phone will itself contain a broad range of callback and enhanced user information constituting the user-customized "identification" of the caller. Then, by issuing a simple command to activate a transfer (in FIG. 15, by pressing the INFOSEND—send enhanced user information—button or issuing a similar command at a voice keyboard), all of the customized caller information stored in the phone can be readily conveyed over the connection to the called party with minimal and perhaps no keystroke activity by the calling party. In this illustration, the caller—obviously not concerned about his privacy vis-a-vis caller identification—is shamelessly sending a slew of information about himself, his business and his family over the connection, either to the primary user directly (as in FIG. 7) or to the primary user's server (as in FIGS. 5 and 6) for later retransmission to the primary user, as illustrated.

As noted earlier, many people do not realize that the memory for frequently-dialed numbers found in many telephones today can already be used to store and send as DTMF digits the caller's own phone number (or any other number the caller wishes to send), thus forming the rudiments of such a user-customized caller identification capability and greatly facilitating the use of this invention by callers. And if the only information being sent is a callback telephone number, then it is easy for the caller to maintain a few callback numbers (e.g., work, home, other frequented locations) in the frequently-dialed memory of the caller's telephone and transmit these to parties that he or she calls, so that on the caller's end, no modification whatsoever is required to many of the telephones already in use today. But, if the more varied enhanced user information forms of FIG. 15 are also included, then this does, for the first time, introduce some required modifications to the calling party's telephone. In particular, additional memories are needed beyond the frequently-dialed number memory, as are additional data communications capabilities to be discussed shortly in connection with FIG. 16.

Second, the enhanced user information variations of this invention allow a calling party to uniquely and individually tailor and customize the callback and related "caller ID" information that is used to identify himself or herself to whomever he or she calls, and it decentralizes the provision of such caller identification information out of the central office switch and into the intelligent end-user telephone equipment (just as this invention also allows a user to establish a paging service based solely on the user's own intelligent customer premise equipment by properly combining elements of FIGS. 5, 8 and 10 as discussed above). The caller's phone—not the central office switch—becomes the seat and source of information identifying the caller (just as the primary user's phone and server become the foundation of the primary user's own, customized, equipment-based paging and callback service). This is true even if the caller's telephone is a standard, unmodified touch tone phone and the caller manually (or via a voice keyboard)

punches in, or maintains in the frequently-dialed number memory, a callback number and other information as described in connection with FIGS. 1–14. But it is even more apparent if the caller's telephone is enhanced with memories storing callback and customized caller identification information to be transferred automatically upon appropriate keyboard (or voice) command (e.g., INFOSEND), as illustrated by FIG. 15. In this enhancement, callback and other user-customized caller identification information is quite expressly stored in memories directly on the caller's telephone—not in memories at the central office switch1— enabling enhanced, user-controlled, user-customized callback and caller identification functionality without the need for any supporting intelligence in the central office switch. In this way, each user of the phone system can establish his or her own desired level of caller identification privacy and determine how he or she will be identified to other users of the phone or switched telephone system. If the switched network supplies ISDN or broadband capability, this enhanced user information can all be transferred on a data channel, with the voice channel reserved to carry voice communication. For information of greater bandwidth, e.g., video, such higher-bandwidth connections may indeed be preferred, if not necessary. Just as with the primary user's telephone, use of this invention is facilitated if the caller's telephone also has a "voice keyboard."

Of course, the server, telephones and other devices belonging to a "primary" user would also have to be equipped with added enhanced user information memory to be able to receive and store enhanced user information from a caller whose phone is so-equipped. Because the memory used in a primary user's phone to store callback and other identifying information as described by this invention can easily be the same memory commonly used to store frequently-called numbers in existing phones, the extension of such memory to house enhanced user information allows the primary user to store enhanced user information in conjunction with these frequently-called numbers as well.

Figure 15:
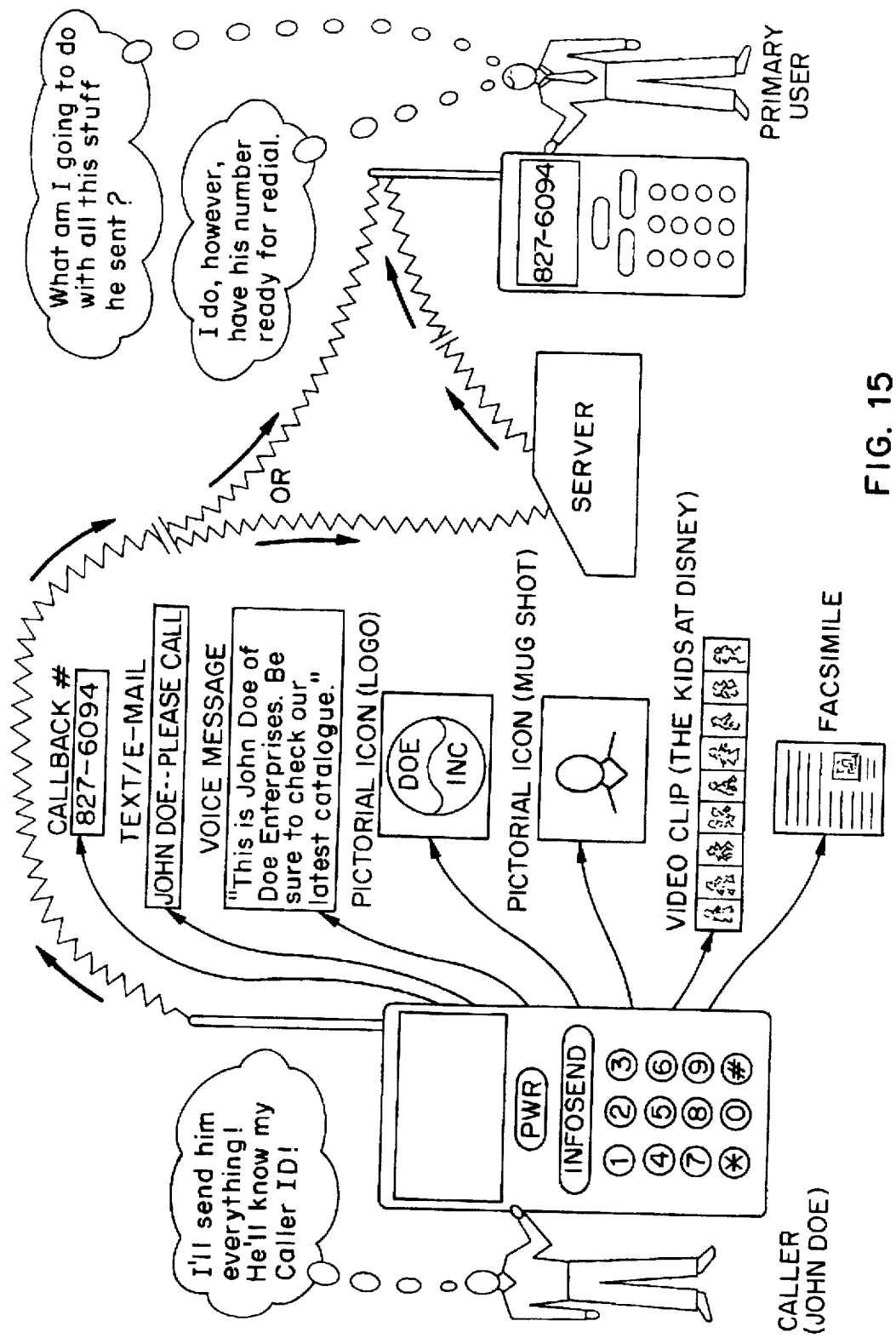
FIG. 15 illustrates how adding a telephone number memory and other enhanced user information memories to a caller's phone greatly facilitates the caller's use of this invention by reducing or eliminating keystrokes and results in a user-customized and controlled form of caller identification.

Again, all of the discussion prior to FIG. 15 requires no modification whatsoever to the caller's ordinary touch tone telephone, but only to the primary user's server and telephone devices. The functionality illustrated in FIG. 15, however, does require the addition of appropriate memory components to the caller's telephone, and also the ability to establish appropriate data communications between the caller's telephone and the primary user's devices, to allow appropriate transfer of the contents of the caller's phone's memory to the primary user's device. The communications sequence for this parallels the one illustrated in FIG. 3.

Figure 16:
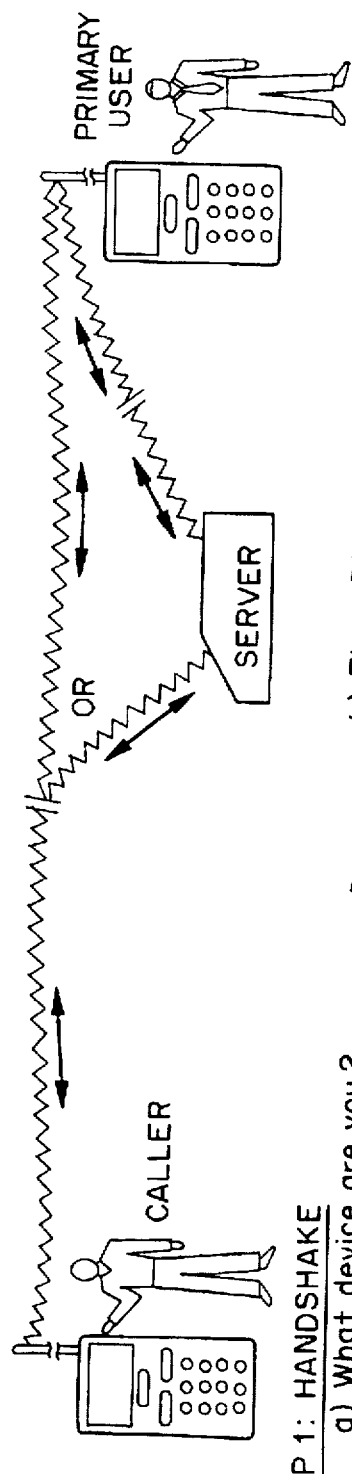
FIG. 16 illustrates the data communication sequences enabling transfer of the user-customized caller identification information illustrated in FIG. 15.
Figure 16:
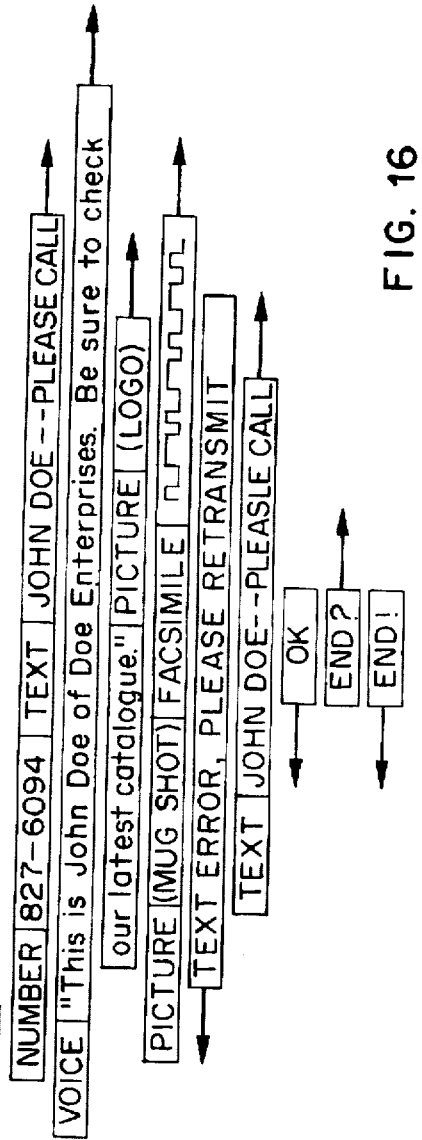

Thus, in FIG. 16, which illustrates one of many possible approaches to such data communications, the first illustrated step is for the caller's phone to engage in a handshake sequence with the primary user's device to establish the protocols the two devices will use for transferring information. The second step is for the actual transmission of information to take place. Somewhere in this process, it is necessary to establish the type of information to be transferred. For example, the caller's phone may be capable of sending video data, but the primary user's device may not be capable of receiving such data, or vice versa, and this would have to be established. (Here, this is done in step 1. It could just as easily be done in Step 2, for example, by attempting to send some item of information, e.g., video, and then receiving a coded reply indicating that the device at the other end is not capable of receiving that type of information.) Upon completion of data transmission, the connection terminates, and the information now resides in place on the primary user's device. When the primary user next engages his or her server from a remote telephone, the information can be further downloaded to the phone and then utilized to initiate a callback based on the telephone numbering information stored in memory. Or, as alternatively illustrated, in the case of a phone-to-phone communication such as that shown in FIG. 7, the identification information so transferred would already reside on the primary user's phone or pager and be immediately available for subsequent memory redial.

Finally, while FIGS. 15 and 16 illustrate telephones capable of containing a broad range of enhanced user information, a telephone with the functional capability of receiving an emitted telephone number over the connection from a server and strong that number in memory for later redial can easily comprise a facsimile machine, a personal communications system, a personal computer, a personal digital assistant, or any other device which can be logically embedded into a single unit that includes this functional capability.

There are some other straightforward variations to this invention that add to its utility and user-friendliness. First, recall that FIG. 3 illustrated a memory management approach where numbers are simply loaded into the next available memory location of the primary user's telephone, wherein which the primary phone sends back a signal to indicate VACANT or FULL before a number is stored. This does not, however, preclude many other possible memory-loading schemas. For example, the primary user might tell a directory assistance operator (FIG. 4) or a secondary telephone user (FIG. 7) that he or she would like the number stored into memory location 11. This is trivially achieved by sending a MEM 11 field in front of the phone number and character information, rather than starting with MEM 1, seeing if it is FULL or VACANT, and then, if full, going on to the next iteration for MEM 2, and so on. In the case of a computer or smart television (FIG. 6), it is very straightforward for the computer phone management software to provide complete flexibility and control over how numbers are stored before they are transmitted to the primary user's phone memory. Indeed, a good software package should allow an individual primary user to define a personal profile of the user's own preferences for how calls are to be ordered and prioritized prior to transmission to the primary user's phone. A knowledgeable secretary or computer operator familiar with the primary user's preferences, work priorities, etc., can further enhance this capability. Further, the organization of data on the computer server can be effectuated by means of signals transmitted from the phone user over the connection to the server. In the case of a phone message answering machine/caller ID box, a linear downloading into the next available memory location of the primary user's phone is most straightforward. However, simple embellishments can enable the primary user to control number emission by the server, for example, by signaling an answering machine to pause after each message, so that the user can punch in a number designating the memory location where that number is to be stored, rather than accept the default of "next empty memory location." Or the primary user can instruct the answering machine not to send a particular number at all, or to download the number the caller left without the caller ID number, etc. In effect, this too gives the user the ability to remotely organize data on the server before downloading to a phone. If the primary user has a random-access memory storage and retrieval capability such as that depicted and discussed in connection with FIG. 13, such ability to have the telephone control number emission from the server and to pause between messages would provide one means for storing free-form vocal patterns, or any other random access keys, in conjunction with the number just (or about to be) transmitted.

Also, the amount of information available on the primary user's phone display impacts ease of use, particularly when a large quantity of telephone numbers have been stored in the phone and the user does not remember which numbers are in which locations. Larger displays which show several consecutive locations can facilitate ease of use, as can a straightforward SCROLL function (forward and backward) that allows the user to quickly browse consecutive memory locations until the desired telephone number is displayed and positioned for redial. Similarly, the simple attachment of a printing device to the phone could allow the user to print out a hardcopy listing of the memory contents in a format that facilitates memory callback. If other sound, character, facsimile, pictorial or video information is included in the transfer as discussed in connection with FIGS. 15 and 16, it would of course be helpful to include a variety of output devices which "display" that information as well.

Figure 17:
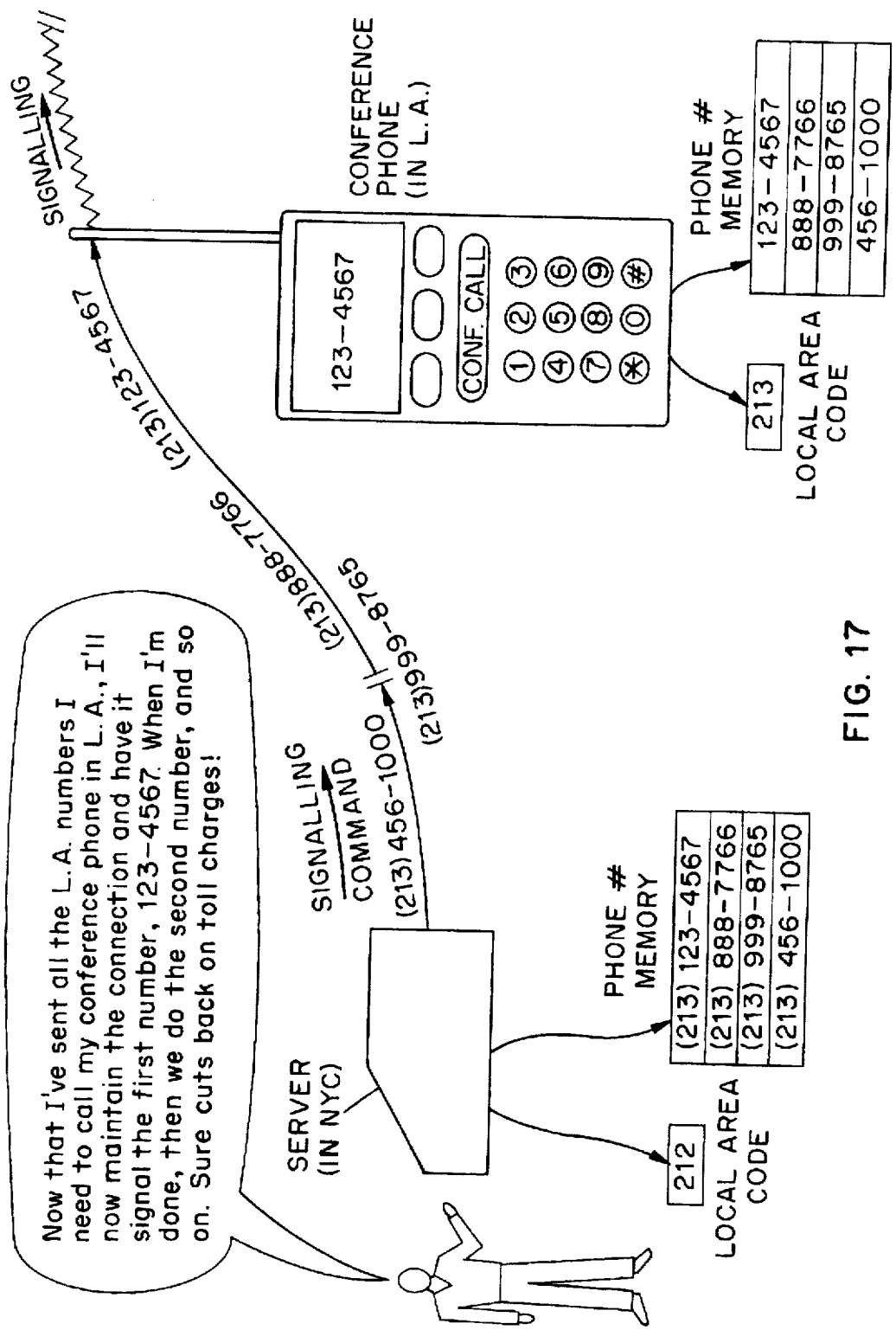
FIG. 17 illustrates an "inverted use" application of this system wherein a server user can call a remote telephone with conference call capability and use the telephone to dial a series of calls, for example, to significantly reduce toll charges.

FIG. 17 depicts an "inverted use" variation of this system, wherein the phone has conference call capability based on numbers stored in its memory. In this variation, if the server is further provided with capability to control signalling by the telephone (hence the "inversion" of the more common situation where the telephone controls number emission by the server), then a server user can call a telephone, emit a series of telephone numbers from the server to the telephone in the usual manner for memory storage pending signalling, maintain the connection while directing the telephone to signal a conference call to one of these stored numbers, and continue to maintain the connection after the call to the first number signalled has been terminated, so that a second number, and subsequent numbers, can similarly be signalled throughout the maintenance of the original connection between the server and the telephone.

This could be useful, for example, for a person on business or vacation far from home who wishes to call multiple telephone numbers within his or her own home area code, but wishes to avoid multiple toll charges. A single toll call from a server to the person's home telephone is all that is needed. Once this single toll connection is established, the server emits all of the numbers to be called, to the telephone, in the usual manner. Then it commands the telephone to signal and patch in to the conference call multiple local telephone calls, in conference or in series. The total charge incurred is thus for a single, longer toll call and multiple local calls, rather than for multiple, shorter toll calls.

In FIG. 17, the server user, in New York City, sends four Los Angeles numbers to a conference call-equipped telephone in Los Angeles. (Note, in many other applications discussed, this user would be at the phone, not the server, and would be remotely commanding the server to emit numbers, rather than remotely commanding the phone to signal numbers—hence "inversion.") Numbers are sent to the L.A. phone in the usual way, such that they can later be signalled. However, once the numbers are all downloaded and superfluous area codes stripped off, the server user emits a command over the connection to the phone asking the phone to signal each number, in sequence, while the conference call between the server and the phone is maintained. Each call is really a "dummy" three-way conference call involving the person at the server, the called party, and the "unmanned" conference phone. Charges for the origination of multiple toll calls can be significantly reduced in this way.

If both the server and the telephone have conference call capability, then in a multiparty conference call with, say, eight parties in New York City and four parties in Los Angeles, a server user in Los Angeles may find it less expensive to connect his or her server with his or her telephone station in New York, and to use the New York telephone as the base station for placing the eight New York calls, and the Los Angeles server for placing the four Los Angeles calls. Here, the total charge is then for one California-to-New York toll call, eight local calls within New York, and four local calls within Los Angeles. Ordinarily, the total charge would be for eight toll calls between California and New York, and four local Calls within Los Angeles.

Finally, it has been noted that as telephone, computing, information, video and other technologies continue to merge, it will be increasingly common for a "telephone" to be much more than a simple "plain old" telephone. Telephones with the functional capability of receiving an emitted telephone number over the connection from a server and strong that number in memory for later redial can easily comprise a facsimile machine, a personal communications system, a personal computer, a personal digital assistant, or any other device which can be logically embedded into a single unit that includes this functional capability. Thus, it is important to recognize that the telephone and/or various servers of this invention can comprise computer hardware and software enabling the telephone user to process and otherwise transform telephone numbers and enhanced user information residing in and passing through the system. For example, hardware and software in a server or telephone can be used to translate information stored in one language, into another language, thereby facilitating development of communications systems enabling even more universal communications among people. Indeed all manner of operation upon and manipulation of telephone numbers and related enhanced user information can occur with appropriate hardware and software on the servers and/or telephone.

Similarly, various databases linked to telephone numbers and the enhanced user information associated therewith enable integration of this system into various systems for personal organization and assistance. Such databases can comprise virtually any information for which linkage with a telephone number and the enhanced user information associated therewith is useful. For example, in one form of interaction between numbering information and a personal digital assistant, a user calendar could cross-reference the user's schedule with various phone numbers represented in the system, including appointments made to follow up on the call, scheduled times for callbacks, other related actions or plans, etc. In connection with some of the hardware and software just described, such a database can even control or initiate the callback of telephone numbers, or can alert the user that such a callback is necessary. Records can be maintained of calls received and the status and disposition of activities associated with these calls. And many other similar, database-linked applications are possible.

Also helpful is a clock providing a date and time which the telephone and the server devices can utilize to "stamp" a telephone number with associated information regarding the date and time when that call was first received by the device.

Assuming an ordinary touch-tone telephone is available to and used by all users of the public switched telephone network (even if the user only has pulse service but can switch the phone to emit tones during a call), it is important to note that this invention is specified such that any individual "primary" user of a switched telephone system can make the individual consumer choice to use or not use this invention, irrespective of whether other users of the switched telephone system also use this invention. The only exceptions are: the directory assistance application, which would require systemic change in offices providing directory assistance; the traditional, central office-based caller ID and call waiting applications, which depend upon the degree to which caller ID and related functions have been implemented by the applicable phone companies and political jurisdictions; and the decentralized, caller-customized, enhanced user information applications as illustrated in connection with FIGS. 15 and 16, which require the addition of enhanced user information memory (e.g., voice, video, etc.) to a "secondary" caller's phone and an enhanced capability for that caller's phone to engage in data communications with the primary user's server, phone, or paging devices. In all other cases, the use of this invention is independent of any systemic change that may or may not be made to the phone system, and is also independent of the degree to which other users of the telephone system have themselves chosen to use this invention.

Finally, while it is preferred to use touch tone (DTMF) signals, those skilled in the art will appreciate that other forms of encoding including digital signals would be equally acceptable for use.

SYSTEM EMBODIMENTS AND VARIATIONS

Basic Structure

Figure 18A:
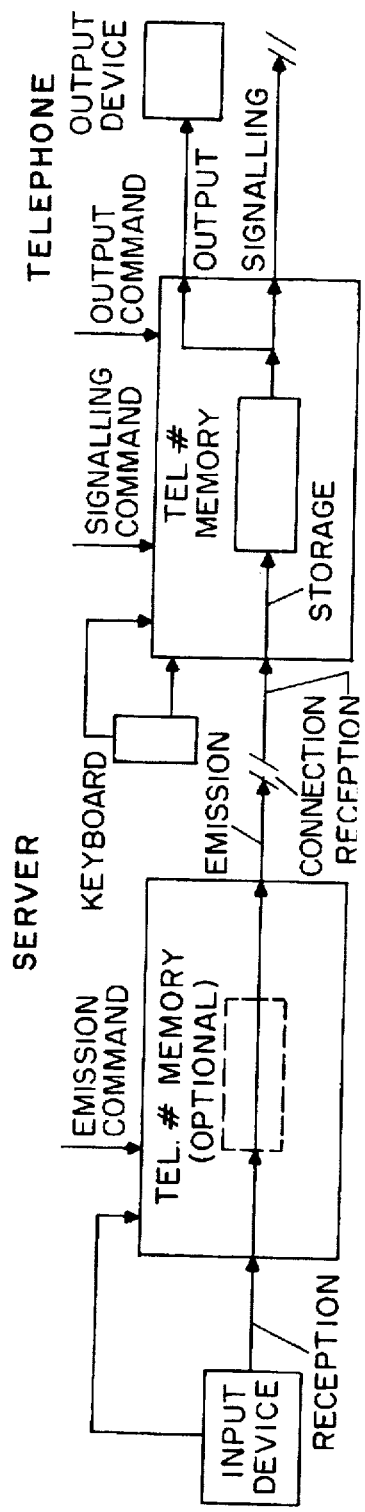
FIG. 18 is a block diagram illustrating the primary embodiments and variations of the overall invention, and forms the basis for a final detailed discussion of these primary embodiments and multiple variations thereof.
Figure 18B:
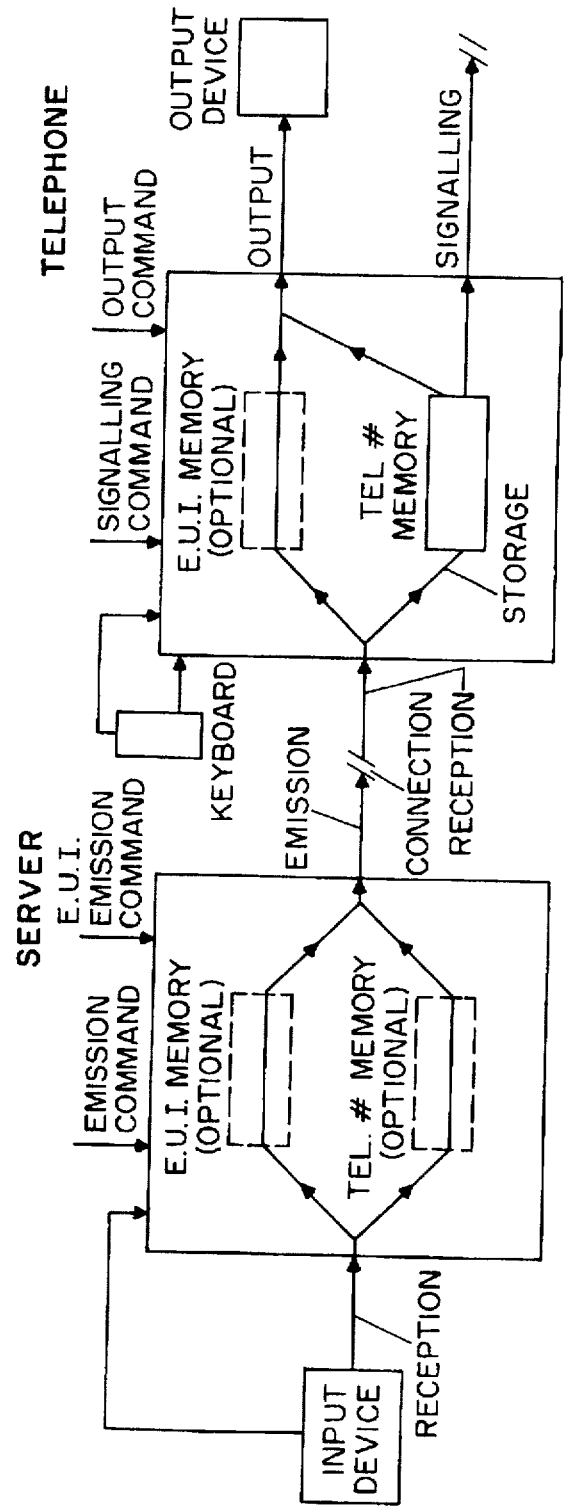
Figure 18C:
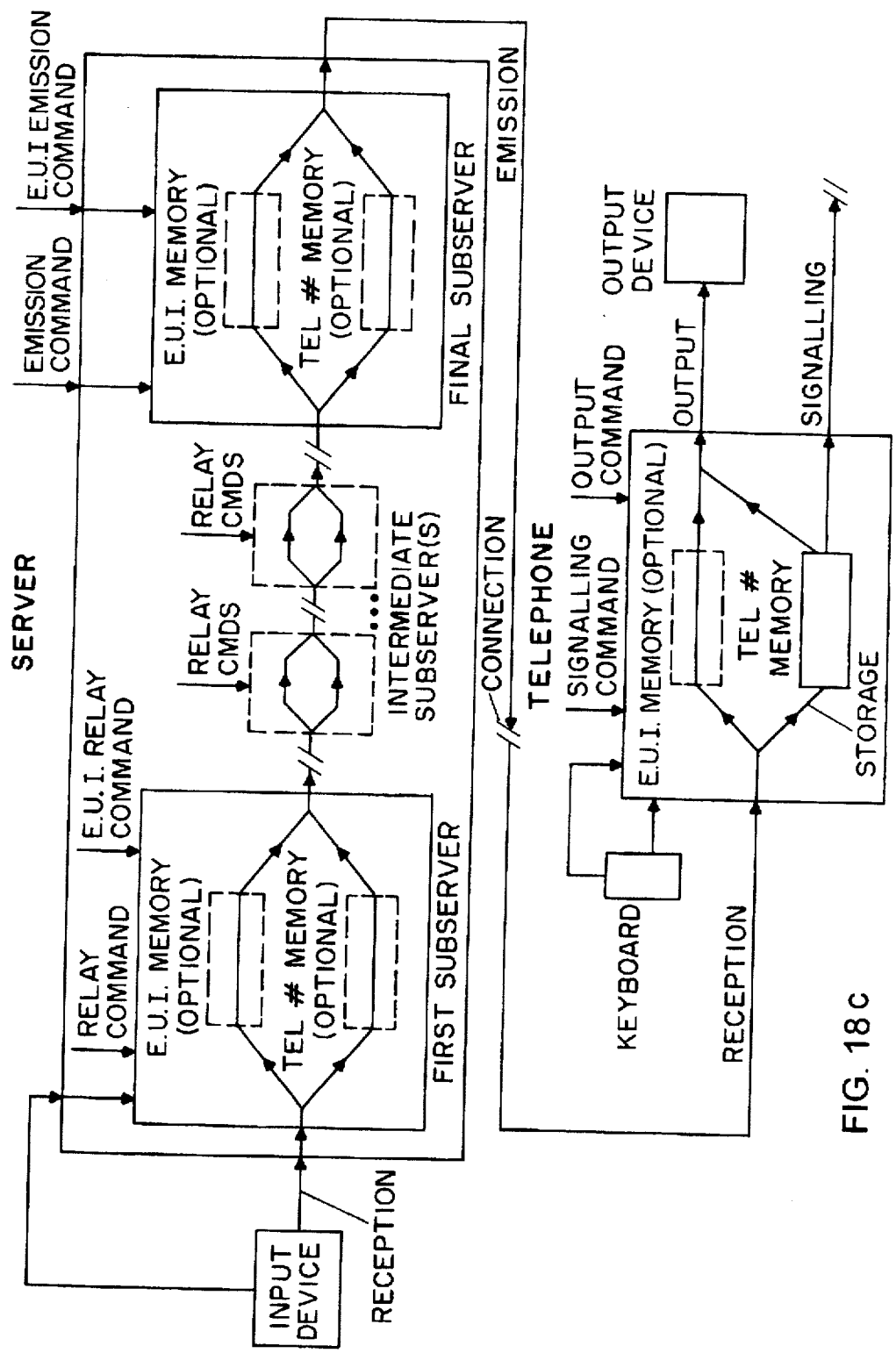

FIG. 18 is a block diagram depicting the primary embodiments and variations of this invention, capturing in more generic form the system characteristics of FIG. 1. Data moving into and out of various system components is depicted by way of connections to the sides of these components. Various command and control signals affecting the system operation and function are depicted by way of connections to the top of these components. In some instances, various memories are required for operation. In others, information can be passed through a device without memory storage and the memory is therefore optional. Thus, all memories but the telephone number memory in the telephone—which is required—are depicted with broken lines. While FIG. 18 and the accompanying discussion below is in reference to the overall system of server and telephone devices depicted by this figure, it is recognized that the server and telephone devices which separately comprise this system, and methods for using this overall system as well as these separate server and telephone devices, also comprise the overall invention described herein.

Part A) of this figure depicts the primary embodiment of the system comprising a server and a telephone connected with one another over a switched telephone network. The telephone number that is ultimately signalled by the telephone is first entered into and received by the server at an input device which also controls the operation of the server. Once in the server, this number may be emitted directly over the connection to the telephone (as shown, for example, in FIG. 7), or it may be stored in a memory within the server (e.g., FIGS. 5 and 6). In either case, when the server receives a command to emit that number, the number is then emitted in a coded format (DTMF, digital, or similar format) from the server to the telephone over the connection, received by the telephone, and then stored in a location in the telephone number memory to be later recalled and signalled when the telephone receives a signalling command to signal that number. The telephone in this primary embodiment has a keyboard enabling data entry and controlling its operations, and an output device. The telephone number may optionally be output/displayed on the output device.

Variation B) of this figure depicts a primary variation wherein the movement of the telephone number through this system is supplemented and accompanied by the similar movement of a variety of associated enhanced user information. Added to the server is the capability to receive and emit both the telephone number and the enhanced user information associated with this phone number. The enhanced user information may be stored in an enhanced user information (E.U.I.) memory in the server, or it may be emitted directly over the connection to the telephone (for example, if the server user is reading in directly from a printed page and sending a facsimile in connection with an emitted number). In either event, the telephone receives this enhanced user information, and can either store it in an E.U.I. memory in the telephone for later output or can output it immediately to the output device (again, as for a direct facsimile output), upon receipt of an output command. The telephone number moves through the system and is ultimately signalled as in the primary embodiment, and may also be output to the output device. Absent this enhanced user information variation, this embodiment reduces to the primary embodiment A).

This variation B) depicts the connection between the server (e.g., answering machine or computer as in FIGS. 5 and 6) and the telephone, but does not depict either the connection between a caller and the server, or the device from which the caller is calling (aside from the type of two-device configuration depicted in FIG. 7). The caller's information enters the system through the server's input device, but the caller's device is not itself part of the system.

In contrast, variation C) of this figure depicts a second primary variation where the server itself is comprised of a plurality of at least two subservers connected to one another over the switched telephone network, receiving and relaying information from one subserver to the next in serial sequence—a server "chain." The overall server, depicted within a large block containing all of the subservers, is identical in its overall function to the server in part B) above. It receives the number and associated enhanced user information from an input device, and irrespective of what happens inside the server (i.e., whether this information is stored in the telephone and E.U.I. memories or directly passed through without storage, whether it passes through one or multiple subservers, etc.), the server ultimately emits this information to the telephone over the connection to then be processed and ultimately signalled by the telephone in the usual manner. This variation C) is important for several reasons.

First, a particularly important variation is the one in which this plurality of subservers comprises exactly two subservers, i.e., the first subserver and the final subserver, without any intermediate subservers. In short, this figure encompasses the many varied situations discussed throughout in which the overall system including the telephone comprises three devices in total. This describes, for example, the arrangement of FIG. 5 wherein a caller places a call from a telephone (the first subserver), leaves the emitted number and associated enhanced user information (commonly, a voice message) on an answering machine (the final subserver), and wherein that information is in turn later emitted from the answering machine to the telephone over the connection, such that the number can ultimately be signalled from the telephone. Thus, in many instances, the first subserver will in fact coincide with the telephone of a caller, and the final subserver will coincide with the answering device of the intended recipient of the call. This final subserver is of course then connected to the call recipient's telephone. This figure also encompasses the structural elements, for example, of a caller placing a call to a paging service, entering the DTMF tones of a callback number which are received on the server of a paging service, and having the server then package that numbering information for further relay to a pager which also has signalling capabilities based on the pager's phone number memory. Thus, in contrast with B), variation C) does depict the calling device itself (first subserver), as well as its connection into the remainder of the system. By including the calling device, this variation encompasses the form of user-customized caller identification wherein the caller might wish to store his or her own identifying information on the telephone, and in the process of making a call, perform a keystroke which automatically forwards this information to a receiving device belonging to the call recipient.

Second, when this plurality of subservers comprises more than two subservers (i.e., when it comprises one or more intermediate subservers) variation C) encompasses the situation where this information may in fact be serially transmitted from one subserver to the next over multiple subservers before it finally makes its way to the telephone for signalling, as is common in many modern networking environments. Information being relayed from one person to the next, and perhaps modified by each along the way, is supported by the structural relationships of part C), with appropriate further variations (e.g., software operating on that information) discussed below.

Finally, closely related, part C) accounts for systems of four or more devices generally. For example, it would encompass the situation where a caller places a call from a telephone (first subserver) to an office, and that information is entered into a computer (intermediate subserver) from a keyboard, such as the computer shown in FIG. 6. Then, a secretary might call the primary user's home answering machine (final subserver) and download all the accumulated calling information to that answering machine over a connection to the switched telephone network. Finally, the primary user calls the answering machine, further downloads all messages from the answering machine to the telephone, and uses the emitted numbers for signalling purposes.

Generally, the signalling of an emitted telephone number stored in the telephone number memory will take place at the telephone's connection to the switched telephone network. In a preferred variation, the server emission means comprises a DTMF signal generator, the emitted number is coded as DTMF digits, and the telephone reception means comprises a DTMF-responsive receiver. Coding in digital and similar formats is equally acceptable.

Numbering Variations

Within the context of the basic structural variations discussed above, a telephone number itself may or may not comprise an area code, international dialing codes, or supplemental "extension" digits. This system can operate on these various numbering variations to ensure that the number stored in the telephone's telephone number memory is appropriate for subsequent signalling, e.g., by stripping off an area code for a local call, prefixing a "1" for a long distance call, and appropriately processing numbers with international dialing codes. In the case of supplemental "extensions," (either a true extension or a second series of digits that are later dialed after some form of "access" number is first dialed and reached), the number may helpfully comprise a "pause" code adding a pause between the signalling of two adjacent digits, with the resumption of signalling taking place after detection of a resumption condition, for instance, after a certain time has elapsed, after the user has signalled a command to resume signalling, or in response to the detection of a tone or similar indicator from the device being signalled indicating its readiness to accept additional digits. A telephone number may also, in the future, be somewhat modified in format as changes are implemented in the NANP. All of these numbering variations are easily accommodated by this system.

Also, it may often be desirable to vocally utter a telephone number into the system and to have that number then translated into coded form somewhere within the system for ultimate use in memory-based recall and signalling, as discussed in connection with FIG. 14. This is readily enabled by an appropriate voice translator on the phone or any of the servers.

Finally, in any situation where numbering information is transmitted from one device to the next, it is always helpful for the devices to exchange verification and confirmation signals to ensure that the number so transmitted has indeed been properly transmitted and received. This is readily achieved by sending appropriate verification and confirmation signals back and forth between two adjacently-connected devices.

Enhanced User Information, Peripheral Device, and Connection Variations

In the enhanced user information variations, the enhanced user information itself may comprise a broad range of information types, including but not limited to alphanumeric character data (e.g., a simple character string identifying a caller, electronic mail, text information), digital information data bits (i.e., any data represented as a stream of digital data "bits"), graphical data (e.g., charts, tables, figures, diagrams in an information system), facsimile image data (i.e., any printed information readily transferrable over a facsimile device), pictorial image data (i.e., any pictorial image that can be scanned into a device or produced within an information system and transmitted along the network to another device, which could include pictorial icons that a caller wishes to send in conjunction with his or her calls), audio data (e.g., an ordinary voice message such as is commonly left on an answering machine, a voice mail message, a sound clip, a tape recording, a musical performance, the sound track of video information), and video data (e.g., any moving video image, including a brief video clip or a full-length video program or event). It is also apparent that this enhanced user information can of course be represented in any spoken or written language. FIGS. 15 and 16 depict some of this enhanced user information and illustrate its transmission within the system.

The input device on the server can comprise a broad range of devices typically used for data entry of these various forms of enhanced user information. Of course, the input device can itself comprise a connection to the switched telephone network, which would be the case, for example, when a caller is leaving a message on an answering machine as in FIG. 5, or when a DTMF number is being provided to a paging service server within the three-device structural arrangement depicted by FIG. 5. The input device can comprise a keyboard such as the computer keyboard shown in FIG. 6, the telephone keyboard on the secondary user's phone in FIG. 7, or a computer mouse. Such a keyboard enables entry of both input data and functional commands. A "voice keyboard" of similar function to a manual keyboard may also be employed. The input device can comprise a caller ID receiver, a DTMF receiver, and a modem or any digital communications receiver (which will generally operate over a connection to the switched network). The input device can also comprise a facsimile scanner (such as is used to enter printed matter into a facsimile device for transmission), a pictorial image scanner (similar to a facsimile scanner but with enhanced capabilities to scan black and white or color picture images), an audio input device (e.g. a voice receiver that receives its voice signal over the network or a microphone receiving its signal from a user who is physically present at the same location), or a video input device (e.g., a video camera, a CAM recorder or similar device). Finally, it can comprise a computer data storage device (e.g., a "floppy" or compact optical disk drive, or a hard disk drive), an audio data storage device (e.g., a tape or other memory recording of audio information, the recorded soundtrack of video information), or a video data storage device (e.g., a video tape being played by a video cassette recorder, the video tracks of a compact optical disk drive, etc.).

Similarly, the output device on the telephone can comprise a broad array of devices responsive to this enhanced user information. The output device can itself be a connection to the switched telephone network (for example, if it is desired to send any of the information residing on the telephone further along to yet another telephone on the network, or to modify some of the information on the phone and then send the modified information to a party at the associated emitted telephone number. Very commonly, the output device on the telephone will comprise a display window displaying telephone numbers and character data residing within the telephone. This device can comprise a video display terminal commonly used on a computer (to display all of the multiple forms of information—video, text, graphics, etc.—that can ordinarily be displayed on a computer display screen), a television monitor (to display that information which a television monitor can ordinarily display), a printer (for printing out phone numbers, alphanumeric text, graphics, and similar information), a facsimile image printer (for the output of facsimile information), a pictorial image printer (for pictorial image printout), an audio speaker (to play back audio data), a computer data storage device (e.g., a "floppy" disk, write-capable optical disk drive, or hard disk drive, enabling long term storage of the information residing in the phone), an audio data storage device (e.g., a tape or other memory recording audio information, including the recorded soundtrack of video information), or a video data storage device (e.g., a video cassette recorder recording video information onto a tape, a device writing video onto a magnetic disk drive or a write-capable optical disk drive, etc.)

In today's world of increasingly mobile communications, the server, telephone, and any and all subservers can obviously have not only a wired, but a wireless connection to the switched telephone network. Indeed, part of the utility of this invention is its ability to greatly simplify addressing for mobile communications during which one may not conveniently write down or signal a phone number. Also, as (narrowband and broadband) ISDN and even higher data rate "broadband" connections become more prevalent in switched telephone networks, the "connections" in this system can indeed be ISDN and broadband connections, not just "plain old" telephone connections. Indeed, these higher data rate connections enable voice and data communications to be carried on separate channels, and will be desirable if not necessary to support some of the more data-intensive forms of enhanced caller information transmission discussed above.

Command, Control and Operation

The command, control and operation of this system takes on a number of forms, and lends itself to a number of variations. The general functional control of the phone takes place via the keyboard, and that of the server via the input device. In FIG. 18, the keyboard and input devices are depicted as connecting not only to the sides of these devices to denote data input, but to the top of these devices, thus denoting command and control. However, it is also possible for the keyboard on the telephone to initiate and control actions by the server (preferably, after the right to control the server has been established, e.g., by supplying a correct password code), wherein a command entered at the telephone is sent back to the server over the connection and thus enables the telephone user to initiate and control the actions of the server. A common example of this, cited earlier in connection with FIG. 2, is where a user calls his or her home answering machine from a remote telephone, enters a password code gaining remote control over the device, and then proceeds to play back messages, record new messages, rewind the tape, and otherwise control the server as if he or she were physically present at the server and entering commands at the server's input device. So as to further reduce the amount of manual operation required to control these devices, the utilization of a voice keyboard (see, e.g., FIG. 12) on the telephone and/or a connection-responsive voice keyboard on the server responsive to utterances into the telephone transmitted to the server over the connection, to control actions of the server and the telephone, is also a desirable feature. So too is a voice keyboard on the telephone that can also, via the connection, control the general functions of the server as just discussed. In the "inverted" use application discussed earlier and further discussed below, one inverts this system control and has the server input device controlling the system, including server actions, telephone actions, number emission, and, particularly, the signalling of numbers by the telephone.

Beyond general functional control, the control functions of particular interest in this system are emission of a telephone number and any associated enhanced user information from the server to the telephone (controlled by the emission and relay commands depicted on FIG. 18), and the signalling of a number stored in the telephone number memory (controlled by the similarly-depicted signalling command). While emission can obviously be controlled at the server's keyboard, it is again very desirable to control emission from the telephone, as in FIG. 5, since the use of this system will often involve the telephone user contacting his or her own "unmanned" server from a distance, in order to receive messages and telephone numbers. Thus, either a manual or voice keyboard on the telephone can generate the emission signals, sent from the telephone to the server over the connection, which then cause the server to emit a desired telephone number (and optionally, associated enhanced user information). Or, one can use a connection-responsive voice keyboard on the server wherein vocal utterances into the phone are transmitted back over the connection to cause the server to initiate number (and optional E.U.I.) emission. For signalling, either a manual or a voice keyboard on the telephone can be used recall a number from memory and to generate the signalling command. And, of course, the input device on the server, including a voice keyboard, can also be used to issue an emission command, and in the inverted use application, is used to issue a signalling command.

Also of interest are various ways of controlling the storage and retrieval of phone numbers and associated enhanced user information to and from various locations in the telephone number memory. A memory command, not explicitly depicted on FIG. 18, can of course be issued from either a manual or voice keyboard on the telephone. Such a command can also be issued by the server, as might be the case in FIG. 6, where the secretary has already determined how the numbers are to be organized when they are sent to the primary user's phone. Storage schemes are also easily based on the contents of the storage locations in the memory, for example, as in FIG. 3, where an emitted number is stored into the next available empty location in the phone number memory and later recalled by reference to that memory location. Finally, a more sophisticated memory management scheme is the random access scheme outlined in FIG. 13, where the user supplies a voice pattern (or other enhanced user information, e.g., a character string—which can originate with the caller or the call recipient) to be stored in association with an emitted number, and the subsequent recall of this number for signalling is based on the user uttering a comparable voice pattern (or supplying comparable other enhanced user information) at a later time, without concern for the numbering or ordering of the various storage locations.

Functional Variations

Starting with these primary embodiments and variations, many further functional variations and combinations are possible. For example, when the server of either FIGS. 18 A) or B) is provided a directory telephone number memory, then the emission in coded form of a number from that memory in response to a directory lookup request corresponds with the directory assistance application of FIG. 4. The directory number "no longer in service" and "for further information, call . . . " applications described earlier are close variations of this basic directory assistance application, based on deactivated and newly-activated telephone number memories, and a newly-activated telephone number memory, respectively. In these applications, what is most relevant is that this directory information be in the server to begin with, not how it got there originally. Nevertheless, the original "input" of directory information into a such a server might be, for example, via a computer disk drive or even a compact optical disk drive (which can contain enough directory information to cover an entire region of the country), while real-time modifications to this information could be input, for example, from modifications to customer account information made at a phone company's business office, via a switched connection to that office.

User-customized directory assistance is possible in the enhanced user information environment by associating a password with each number in these directory assistance applications, and allowing a caller to customize (e.g., add, modify, delete) the enhanced user information associated with that number, over the connection, by supplying the proper password proving that the number is in fact the caller's own number. In effect, this could enable user-customized, on-line, real-time, interactive, enhanced user information "yellow page" directories, and similar enhanced user information variations of telephone directories, as discussed earlier in connection with FIG. 4.

In an important functional variation of FIG. 18, the telephone and/or various servers (including subservers) of FIG. 18 can comprise computer hardware and software enabling the telephone user to process and otherwise transform telephone numbers and enhanced user information residing in and passing through the system, as discussed earlier. For example, hardware and software in a server or telephone can be used to translate information stored in one language, into another language, thereby facilitating development of communications systems enabling even more universal communication among people. Indeed all manner of operation upon and manipulation of telephone numbers and related enhanced user information can occur with appropriate computer hardware and software on the servers and/or telephone.

Similarly, various databases linked to telephone numbers and the enhanced user information associated therewith enable integration of this system into various systems for personal organization and assistance. Such databases can comprise virtually any information for which linkage with a telephone number and the enhanced user information associated therewith is useful. As discussed earlier, for example, in one form of interaction between numbering information and a personal digital assistant, a user calendar could cross-reference the user's schedule with various phone numbers represented in the system, including appointments made to follow up on the call, scheduled times for callbacks, other related actions or plans, etc. In connection with some of the hardware and software just described, such a database can even control or initiate the callback of telephone numbers, or can alert the user that such a callback is necessary. Records can be maintained of calls received and the status and disposition of activities associated with these calls. And many other similar, database-linked applications are possible.

On the telephone itself, another useful functional variation is that discussed in FIG. 8, wherein the telephone also comprises the combined functionality of more traditional pagers, answering machines and caller ID devices, and where the "caller identification" information that is output by the telephone to advise the recipient who is calling and what the call is about can include a broad range of enhanced user information that is customized by the caller on the caller's device, not by a phone company at a central office switch. This includes automated call pickup to automatically pickup an incoming call, establish the connection, possibly send out a message, tone or similar indicator for the caller to emit the telephone number and optional enhanced user information, store the emitted number and enhanced user information in the telephone number and E.U.I. memories, and terminate the connection, based on automated call pickup conditions such as detection of an incoming call, completion of a specified number of rings or expiration of a specified time period without the user first picking up the telephone, an entry at the telephone keyboard, or the caller ID detection of a call fitting a particular user-defined profile. It also includes allowing the user to maintain the connection and enable manual phone pickup by the user for a brief period of time following automatic call pickup and output of the emitted number and optional enhanced user information by the output device and prior to termination of the connection, similarly to how one can pick up a telephone to connect with an incoming call to an answering machine, if desired, once the voice on the machine indicates who is in fact calling. Also useful is the telephone device generating a DTMF signal corresponding to a number in memory, so that the number can be signalled by holding this device in close proximity to a second telephone sounding a DTMF-responsive dial tone. Call waiting variations discussed in FIG. 9, with enhanced user information, can also display user-customized caller identification information, including an emitted telephone number and associated enhanced user information from the caller, allowing the phone user to determine whether or not to interrupt the current call and pickup the waiting call, and in any event, providing the phone user with the emitted number for later callback. With a caller ID signal being matched against a user-defined profile, the phone itself can also determine whether or not to interrupt the present call to receive the call waiting. Finally, as noted in the above discussion of output devices, the telephone itself can easily be provided means to emit phone numbers and enhanced user information in the telephone, over the connection, to yet another device.

On the servers (including subservers), it is a helpful variation to include means through which the server can be commanded to organize telephone numbers and other information on the server before emission to the telephone. Such means of organizing phone numbers may often comprise the computer hardware, software and databases discussed earlier. In FIG. 6, this was achieved by a secretary organizing numbers in the server through the input device. But, as discussed, user profiles with appropriate software can also be used to achieve this, as can signals generated by the telephone user and sent from the telephone to the server over the connection so as to command the server in its numbering organization. Call and enhanced user information selection, wherein a phone user can determine by a command to the server whether or not to transmit a particular phone number or item of enhanced user information from the server to the telephone is yet another way of enabling the phone user to organize the information on the server. It is also helpful for the server to be capable of initiating a call to the telephone when a call initiation condition has been recognized by the server, as discussed in connection with FIG. 10. Of course, the telephone's number would be entered to reside in a memory within the server so that the server-initiated call will be signalled to the correct number. This call initiation condition can be based on the quantity of calls received by the server, the receipt of a particular telephone call, or a user profile defining a more complex set of conditions under which the call should be initiated.

With this server call initiation variation, as discussed earlier, one can combine the functionality of FIGS. 5, 8 and 10 to reproduce the functionality of a paging system with added memory-based callback functionality, without the need for separate subscription to a paging service. Particularly, by setting the server to initiate a call to the primary user's telephone any time it receives a call (i.e., by basing the call initiation condition on the quantity of calls received by the server and by setting the quantity of calls needed for server initiation of a call to be equal to "one"), and by setting the primary user's phone to automatically pickup an incoming call immediately and store the emitted number straight into memory without any intervention by the user (i.e., where the automatic call pickup condition comprises detection of any incoming call), a user can establish his or her own paging service based completely on his or her own end-user equipment, and without any need whatsoever for a centralized paging service. The primary user's server acts just like a paging service receiving and forwarding callback numbers for incoming calls as they are received, and the primary user's phone acts just like a pager, storing callback numbers straight into memory as soon as they are received. Unlike in a paging service, these numbers can also be later recalled and signalled from the telephone's memory. Again, this capability is based completely on the intelligence of the end user equipment, not the network. By employing varying combinations of the parameters defining the call initiation and the automatic call pickup conditions, the user can precisely configure and customize the user-defined paging service to his or her own individual tastes and priorities. And as noted, a related variation of this invention also includes the situation where a pager in a more traditional, centralized paging service is combined with a telephone allowing memory-based signalling of telephone numbers in the pager's telephone number memory.

Also helpful is a clock providing a date and time which the telephone and the server devices can utilize to "stamp" a telephone number with associated information regarding the date and time when that call was first received by the device.

Finally, as discussed in connection with FIG. 17, a useful variation involves "inverted use," wherein the telephone has conference call capability based on emitted numbers stored in its memory, and the server has the capability to control the telephone, particularly memory recall and signalling by the telephone. As discussed, this variation is even more flexible if both the server and the telephone have a conference call capability. These variations can be particularly useful in reducing toll charges when calling a series of out-of-area phone numbers.

I claim:

1. An end-user customizable, end-user telephone equipment-based paging and messaging system, the system comprising a server and a telephone each having a connection to a switched telephone network:

the server comprising:
- an input device;
- first reception means responsive to the input device for receiving a received telephone number into the server as a resident telephone number;
- means responsive to a call initiation condition generated by a custom call initiation profile, to initiate a telephone call from the server to the telephone and initiate a connection therebetween over said switched telephone network;
- an auxiliary memory storing an auxiliary telephone number which is the telephone number of the telephone, which the server shall use to signal said telephone; and
- emission means responsive to an emission command for emitting in coded form said resident telephone number, from the server to the telephone over the connection therebetween, as an emitted telephone number;

the telephone comprising:
- a keyboard comprising a plurality of keys;
- a telephone number memory comprising a plurality of storage locations storing telephone numbers;
- means responsive to an automatic call pickup condition to automatically pickup an incoming call and establish the connection between the server and the telephone;
- second reception means responsive to receipt of said emitted telephone number over said connection between the server and the telephone for storing the emitted number into a storage location in the telephone number memory as a stored telephone number;
- call termination means to terminate said connection following said storing of the emitted telephone number into the telephone number memory; and
- an output device outputting said stored telephone number.

2. The system of claim 1, said telephone further comprising retrieval and signalling means responsive to a retrieval and signalling command for retrieving the emitted number from its storage location in the telephone number memory and then calling said emitted number.

3. The system of claim 1, wherein whether to generate said call initiation condition generated by a custom call initiation profile, is determined by virtue of the server comparing said received telephone number to a plurality of telephone numbers pre-defined in said custom call initiation profile and matching said received telephone number with one among said plurality of telephone numbers.

4. The system of claim 1, wherein said call initiation condition generated by a custom call initiation profile, is generated whenever a call has been received by the server.

5. The system of claim 1, wherein said call initiation condition generated by a custom call initiation profile, is generated by virtue of the server comparing the quantity of calls received by said server with a call quantity pre-defined in said custom call initiation profile.

6. The system of claim 1, wherein said call initiation condition generated by a custom call initiation profile, is generated by virtue of the actual time reaching a pre-defined time in said custom call initiation profile.

7. A system for obtaining, storing and signalling telephone numbers, the system comprising a server and a telephone each having a connection to a switched telephone network:

the server comprising:
an input device;
first reception means responsive to the input device for receiving a received telephone number into the server as a resident telephone number;
emission means responsive to an emission command for emitting in coded form said resident telephone number, from the server to the telephone over the connection therebetween, as an emitted telephone number;

the telephone comprising:
a keyboard comprising a plurality of keys, further comprising a voice keyboard responsive to a plurality of vocal utterances, each of said utterances corresponding and having an effect identical to the manual depression of one of the plurality of keys on said keyboard;
a telephone number memory comprising a plurality of storage locations storing telephone numbers;
second reception means responsive to receipt of said emitted telephone number over said connection between the server and the telephone for storing the emitted number into a storage location in the telephone number memory as a stored telephone number; and
retrieval and signalling means responsive to a retrieval and signalling command for retrieving the emitted number from its storage location in the telephone number memory and then calling said emitted number; wherein
said retrieval and signalling command is issued by vocal utterance into said voice keyboard.

8. A system for obtaining, storing and signalling telephone numbers, the system comprising a server and a telephone each having a connection to a switched telephone network:

the server comprising:
an input device;
first reception means responsive to the input device for receiving a received telephone number into the server as a resident telephone number;
emission means responsive to an emission command for emitting in coded form said resident telephone number, from the server to the telephone over the connection therebetween, as an emitted telephone number;

the telephone comprising:
a keyboard comprising a plurality of keys;
a voice pattern memory comprising a plurality of storage locations storing a plurality of voice patterns as stored voice patterns;
a voice input and pattern generating device generating a machine-readable representation of a vocal utterance into the device;
voice storage means responsive to the voice input and pattern generating device for storing said machine-readable representation of said vocal utterance into the voice pattern memory as one of said stored voice patterns;
means for detecting a match between a second vocal utterance into the voice input and pattern generating device and one of said stored voice patterns;
a telephone number memory comprising a plurality of storage locations storing telephone numbers;
second reception means responsive to receipt of said emitted telephone number over said connection between the server and the telephone for storing the emitted number into a storage location in the telephone number memory as a stored telephone number in association with one of said stored voice patterns; and
retrieval and signalling means responsive to a retrieval and signalling command for retrieving the emitted number from its storage location in the telephone number memory and then calling said emitted number; wherein
the emitted number is selected and retrieved from one of said plurality of storage locations in said telephone number memory, and then called, based upon detecting a match between said second vocal utterance and the stored voice pattern associated with said emitted number.

9. A system for obtaining, storing and signalling telephone numbers, the system comprising a server and a telephone each having a connection to a switched telephone network and having established a connection to one another over said switched telephone network:

the server comprising:
an input device;
first reception means responsive to the input device for receiving a received telephone number into the server as a resident telephone number; and
first emission means responsive to an emission command for emitting in coded form said resident telephone number, from the server to the telephone over the connection therebetween, as an emitted telephone number; and the telephone comprising:
a keyboard comprising a plurality of keys;
a telephone number memory comprising a plurality of storage locations storing telephone numbers;
second reception means responsive to receipt of said emitted telephone number in coded form from the server to the telephone over the connection therebetween for storing the emitted number into a storage location in the telephone number memory;
retrieval and signalling means responsive to a retrieval and signalling command for retrieving the emitted number from its storage location in the telephone number memory and then signalling said emitted number; and conference call means responsive to the retrieval and signalling command, to signal and establish a conference call among several telephone addresses on the switched telephone network by retrieving and signalling telephone numbers stored in the telephone number memory;

wherein the retrieval and signalling command comprises an entry at the server input device emitted from the server to the telephone over the connection;

wherein the telephone, upon receipt of said retrieval and signalling command, initiates a first telephone call to a first telephone address by signalling an emitted telephone number stored in the telephone number memory while maintaining the connection between the telephone and server thereby establishing an initial conference call among the server, the telephone, and the said first telephone address, and similarly initiates additional telephone calls to additional telephone addresses by signalling emitted additional telephone numbers stored in the telephone number memory if the signalling command so indicates, while maintaining the initial conference call, thereby adding said additional telephone addresses to said initial conference call.

10. The system of claim 9, wherein the telephone maintains the connection between the telephone and the server after termination of the call between the telephone and the devices signalled by said telephone numbers stored in the telephone number memory, enabling second and subsequent conference calls to be similarly placed if the signalling command so directs.

11. A system for obtaining, storing and signalling telephone numbers, the system comprising a server and a telephone each having a physical connection to a switched telephone network and having established a network connection to one another over said switched telephone network:

the server comprising:

a telephone number memory comprising a plurality of storage locations storing telephone numbers;

an information memory comprising a plurality of storage locations storing associated information linked to and associated with each of said telephone numbers stored in the telephone number memory;

first emission means responsive to an emission command for emitting in coded form a telephone number residing in the telephone number memory, from the server to the telephone over the connection therebetween, as an emitted telephone number;

second emission means responsive to said emission command for emitting associated information in the information memory and associated with said telephone number, in coded form, from the server to the telephone over the connection therebetween, as emitted associated information;

means responsive to a call received by the server from the telephone over the connection therebetween for collecting information indicative of a particular telephone number residing in said telephone number memory, desired by a caller placing said call;

means responsive to the information indicative of the particular telephone number desired by the caller for looking up said particular directory telephone number in said telephone number memory;

a password code memory comprising a plurality of storage locations storing personal identification password codes associated with each directory telephone number in said directory telephone number memory; and means responsive to a second call from a second caller received by the server from the a second telephone over a second connection therebetween for operating upon said stored associated information;

wherein the emission command comprises successful completion of said looking up in said directory telephone number memory of said particular telephone number desired by the caller, the emitted telephone number is said directory telephone number yielded by said looking up, and the emitted associated information is said associated information associated with the emitted telephone number; and wherein the second caller, by supplying information indicative of the second caller's own directory telephone number and correctly supplying the personal identification password code associated with the second caller's own directory telephone number, is thereby enabled to operate upon the associated information linked to and associated with the second caller's own directory telephone number;

the telephone comprising:

a keyboard comprising a plurality of keys;

a second telephone number memory comprising a plurality of storage locations storing telephone numbers;

reception means responsive to receipt of said emitted telephone number in coded form from the server to the telephone over the connection therebetween for storing the emitted number into a storage location in the second telephone number memory, as a second stored telephone number;

second reception means responsive to receipt of said emitted associated information associated with the emitted telephone number, emitted in coded form from the server to the telephone over the connection therebetween, for receiving into the telephone said emitted associated information associated with said emitted telephone number; and retrieval and signalling means responsive to a retrieval and signalling command for retrieving the emitted number from its storage location in the second telephone number memory and then signalling said emitted number.

12. A telephone number and associated information server comprising:

a telephone number memory comprising a plurality of storage locations storing telephone numbers;

an information memory comprising a plurality of storage locations storing associated information linked to and associated with each of said telephone numbers stored in the telephone number memory;

first emission means responsive to an emission command for emitting in coded form a telephone number residing in the telephone number memory, from the server to the telephone over the connection therebetween, as an emitted telephone number;

second emission means responsive to said emission command for emitting associated information in the information memory and associated with said telephone number, in coded form, from the server to the telephone over the connection therebetween, as emitted associated information;

means responsive to a call received by the server from the telephone over the connection therebetween for collecting information indicative of a particular telephone number residing in said telephone number memory, desired by a caller placing said call;

means responsive to the information indicative of the particular telephone number desired by the caller for looking up said particular directory telephone number in said telephone number memory;

a password code memory comprising a plurality of storage locations storing personal identification password codes associated with each directory telephone number in said directory telephone number memory; and means responsive to a second call from a second caller received by the server from the a second telephone over a second connection therebetween for operating upon said stored associated information;

wherein the emission command comprises successful completion of said looking up in said directory telephone number memory of said particular telephone number desired by the caller, the emitted telephone number is said directory telephone number yielded by said looking up, and the emitted associated information is said associated information associated with the emitted telephone number; and wherein the second caller, by supplying information indicative of the second caller's own directory telephone number and correctly supplying the personal identification password code associated with the second caller's own directory telephone number, is thereby enabled to operate upon the associated information linked to and associated with the second caller's own directory telephone number.

13. A system for obtaining, storing and signalling telephone numbers, the system comprising a server and a telephone each having a connection to a switched telephone network:

the server comprising:
an input device;
first reception means responsive to the input device for receiving a received telephone number into the server as a resident telephone number;
emission means responsive to an emission command for emitting in coded form said resident telephone number, from the server to the telephone over the connection therebetween, as an emitted telephone number;

the telephone comprising:
a keyboard comprising a plurality of keys, further comprising a voice keyboard responsive to a plurality of vocal utterances, each of said utterances corresponding and having an effect identical to the manual depression of one of the plurality of keys on said keyboard;
a telephone number memory comprising a plurality of storage locations storing telephone numbers;
second reception means responsive to receipt of said emitted telephone number over said connection between the server and the telephone for storing the emitted number into a storage location in the telephone number memory as a stored telephone number; and
retrieval and signalling means responsive to a retrieval and signalling command for retrieving the emitted number from its storage location in the telephone number memory and then calling said emitted number; wherein said emission command is issued by vocal utterance into said voice keyboard.

* * * * *